(12) United States Patent
Saitoh et al.

(10) Patent No.: US 8,862,434 B2
(45) Date of Patent: Oct. 14, 2014

(54) MAINTENANCE EXPERT SYSTEM FOR MEASURING INSTRUMENT

(75) Inventors: Shunji Saitoh, Tokyo (JP); Tatsumi Kameyama, Tokyo (JP)

(73) Assignee: Oval Corporation, Tokyo (JP)

( * ) Notice: Subject to any disclaimer, the term of this patent is extended or adjusted under 35 U.S.C. 154(b) by 395 days.

(21) Appl. No.: 13/255,564

(22) PCT Filed: Oct. 4, 2010

(86) PCT No.: PCT/JP2010/067711
§ 371 (c)(1),
(2), (4) Date: Sep. 9, 2011

(87) PCT Pub. No.: WO2011/043450
PCT Pub. Date: Apr. 14, 2011

(65) Prior Publication Data
US 2012/0029876 A1    Feb. 2, 2012

(30) Foreign Application Priority Data
Oct. 9, 2009    (JP) .................................. 2009-235787

(51) Int. Cl.
| | | |
|---|---|---|
| G01D 3/00 | (2006.01) | |
| G01F 25/00 | (2006.01) | |
| G01F 1/84 | (2006.01) | |
| G01D 3/08 | (2006.01) | |
| G01K 1/02 | (2006.01) | |

(52) U.S. Cl.
CPC .............. *G01K 1/02* (2013.01); *G01F 25/0007* (2013.01); *G01F 1/8436* (2013.01); *G01D 3/08* (2013.01)
USPC ........................................................ 702/184

(58) Field of Classification Search
CPC ....................................................... G01D 3/08
USPC ............................................................. 702/184
See application file for complete search history.

(56) References Cited

U.S. PATENT DOCUMENTS

| | | | | |
|---|---|---|---|---|
| 5,463,905 A | * | 11/1995 | Baird | .......................... 73/861.25 |
| 2002/0069022 A1 | * | 6/2002 | Fincke | ............................. 702/45 |

FOREIGN PATENT DOCUMENTS

| | | |
|---|---|---|
| JP | 7-160157 | 6/1995 |
| JP | 2000-121393 | 4/2000 |
| JP | 2000-139831 | 5/2000 |
| JP | 2004-138541 | 5/2004 |
| JP | 2005-327201 | 11/2005 |
| JP | 2009-178713 | 8/2009 |

OTHER PUBLICATIONS

International Search Report issued Dec. 7, 2010 in International (PCT) Application No. PCT/JP2010/067711.

* cited by examiner

*Primary Examiner* — Bryan Bui
(74) *Attorney, Agent, or Firm* — Wenderoth, Lind & Ponack, LLP.

(57) ABSTRACT

Provided is a measuring instrument for measuring an object to be measured, including: a CPU (9) including a plurality of internal timer counters and having a function of calculating a measured value of the object to be measured based on detection values of various sensors; a power supply circuit (3) for supplying power to the CPU (9); a detector (4) for detecting a state of the object to be measured; a display unit (5) for displaying detection input data input from the various sensors and the state of the object to be measured, which is obtained through a calculation; a real-time clock IC (RTC) (11) for measuring an elapsed time; an EEPROM (12) for storing data input to the CPU (9); and an FeRAM (13) for storing input values from the various sensors, and storing a calculation result obtained through a calculation performed by the CPU (9) based on the input values from the various sensors.

20 Claims, 15 Drawing Sheets

MAINTENANCE EXPERT SYSTEM FOR MEASURING INSTRUMENT

TECHNICAL FIELD

The present invention relates to a measuring instrument, such as a flowmeter, a thermometer, a barometer, and a spectrometer (densimeter, densitometer), and more particularly, to a maintenance expert system for a measuring instrument, which is capable of recording information on an operation state observed in a measuring instrument and, in a case of occurrence of a problem in the measuring instrument, providing assistance to a field engineer in diagnosing a cause of the problem.

BACKGROUND ART

In general, examples of measuring instruments include a flowmeter, a thermometer, a barometer, and a spectrometer (densimeter, densitometer), and those measuring instruments each have a function of constantly observing a measurement result of the measuring instrument. In addition, in the measuring instrument, various sensors perform state monitoring, that is, monitoring regarding in what condition the measuring instrument is being operated.

Examples of the flowmeter include a positive displacement flowmeter and a Coriolis flowmeter. The positive displacement flowmeter includes a measuring chamber having a rotor, which rotates in proportion to the volume of a fluid to be measured flowing through a flow tube, provided therein, and determines the flow rate based on the rotation of the rotor rotating in proportion to the volume of the fluid to be measured flowing into the measuring chamber. The Coriolis flowmeter is a mass flowmeter in which one end or both ends of a flow tube through which a fluid to be measured is flowing are supported, and which utilizes a fact that a mass flow rate is proportional to a Coriolis force acting on the flow tube (which is a tube in which oscillation is to be generated) when oscillation is generated in a direction perpendicular to a flow direction of the flow tube with the supported points being fixed.

Further, the spectrometer such as a densimeter or a densitometer uses an analyzing device configured by an ion source, an analyzer, and a detector, thereby ionizing a compound by the ion source and analyzing the compound based on a spectrum.

The thermometer, which is an instrument for measuring temperature, measures the temperature by utilizing such a physical phenomenon as a change in property caused by temperature change. Further, the barometer is a device for measuring a pressure, which is a force acting per unit area.

Those measuring instruments sometimes suffer from problems. When a problem has occurred to such a measuring instrument, a field engineer comes to inspect the measuring instrument. When the field engineer inspects the measuring instrument, he/she uses a technique of troubleshooting.

The technique of troubleshooting is a method in which the cause of the problem is found by excluding possible causes of the problem, and such a method is adopted in a field such as system administration. Such a technique of troubleshooting is used, for example, in a case where a measuring instrument which has been in operation suddenly stops operating and measurement cannot be performed. In the troubleshooting, components constituting the system are checked one by one.

Description is given by taking as an example the Coriolis flowmeter, which is a typical flowmeter among measuring instruments. The Coriolis flowmeter is a mass flowmeter in which one end or both ends of a flow tube through which a fluid to be measured is flowing are supported, and which utilizes the fact that a mass flow rate is proportional to the Coriolis force acting on the flow tube (which is a tube in which oscillation is to be generated) when oscillation is generated in a direction perpendicular to a flow direction of the flow tube with the supported points being fixed. The Coriolis flowmeter is well known, and the shape of the flow tube in the Coriolis flowmeter is classified into two major types of a straight tube type and a U-shaped tube type.

Then, the Coriolis flowmeter, which is a typical flowmeter among measuring instruments, is a mass flowmeter in which a measuring tube, through which a fluid to be measured flows, is supported at both ends thereof, and when a central portion of the supported measuring tube is alternately driven in a direction perpendicular to a support line, a phase difference signal proportional to a mass flow rate is detected between the supported portions positioned at symmetric positions of the measuring tube at its both ends with respect to the central portion. The phase difference signal represents an amount proportional to the mass flow rate, but assuming that a drive frequency is constant, the phase difference signal can be detected as a time difference signal between observation positions of the measuring tube.

When the frequency for alternately driving the measuring tube is made equal to the eigen frequency of the measuring tube, a constant drive frequency can be obtained according to the density of the fluid to be measured, which enables driving the measuring tube with small drive energy. Accordingly, in recent years, it has been a common practice to drive the measuring tube at the eigen frequency, and the phase difference signal is detected as the time difference signal.

When a problem has occurred to a measuring instrument, and a field engineer comes to inspect the measuring instrument, many cases of the troubleshooting performed by the field engineer for the flowmeter have no reproducibility. Accordingly, the field engineer estimates the cause of the problem by his/her experiences. As a result, depending on the field engineer's skill, he/she may mistakenly estimate the cause of the problem and set a wrongly-estimated cause, resulting in a longer time period required for the solution to the problem.

A manufacturer of products sets a maintenance period in advance for its own delivered products, and, for a given period of time after the delivery, guarantees the securing of replacement parts or the provision of maintenance for the users of the products. The maintenance period of the products is determined based on a suppliable period of the replacement parts, the life of the parts, or the like.

For example, JP 2005-327201 A proposes a maintenance support program for performing a reliability analysis on an apparatus based on equipment maintenance information including failure information, replacement information, update information, and the like of the apparatus, which are fed back from the place of operation of the apparatus (including various units, such as a product, a product type, a part, a part type, equipment, a system, a device, a product model, a part model, and a plant), and on shipping information of the apparatus, including shipping date information, design information, and the like of the apparatus.

The maintenance support program of JP 2005-327201 A is for extracting data in a desired combination of items including, for example, a product type, apart type, and a model, which are examples of identification information of the apparatus, and a business type and a customer name, which are examples of customer identification information of the apparatus, and for executing calculation or the like of a failure occurrence probability density function or an unreliability function with respect to a result of the data extraction.

Further, considering the fact that, with the maintenance support program described in JP 2005-327201 A, while the reliability of the product can be improved by setting a maintenance timing for the apparatus or the part of a set model, it is impossible to perform prioritization for determining an apparatus to be subjected to the maintenance, JP 2009-178713 A proposes a control system for water treatment facilities which can continuously support the setting of a maintenance and inspection frequency for equipment of a membrane treatment facility in order to supply tap water or regenerated water of stable quality and quantity by water treatment using a membrane.

DISCLOSURE OF THE INVENTION

However, JP 2005-327201 A is directed to the maintenance support program for extracting data in a desired combination of items including, for example, a product type, a part type, and a model, which are examples of identification information of the apparatus, and a business type and a customer name, which are examples of customer identification information of the apparatus, and for executing calculation or the like of a failure occurrence probability density function or an unreliability function with respect to a result of the data extraction, and thus has a problem in that, unlike the present invention, it is impossible to provide, in the maintenance performed by the field engineer, assistance to the field engineer in diagnosing the cause when the troubleshooting is performed for the measuring instrument.

Further, JP 2009-178713 A is directed to the control system for water treatment facilities which can continuously support the setting of a maintenance and inspection frequency for equipment of a membrane treatment facility in order to supply tap water or regenerated water of stable quality and quantity by water treatment using a membrane, and thus has a problem in that, unlike the present invention, it is impossible to provide, in the maintenance performed by the field engineer, assistance to the field engineer in diagnosing the cause when the troubleshooting is performed for the measuring instrument.

Further, considering that the measuring instrument receives power supply, in a case where the measuring instrument is installed for measurement in such a place that a substance to be measured or an atmosphere contains a flammable gas, an explosion-proof structure is required.

Note that, even if there is no need for external power supply, in a case of using a memory which relies on a battery for constantly retaining data, such as a conventional SRAM (volatile memory), a backup battery is necessary, and it is impossible to perform maintenance by opening a cover of the measuring instrument under such an environment unless the capacity of the battery is smaller than an energy level which may set fire to an ambient gas, or unless the battery is provided with a safeguard, and a protection mechanism is provided so that those components are not directly exposed to the gas. Thus, in the case of using a memory which relies on a battery for retaining data, such as a conventional SRAM, it is not easy to adopt a pressure-resistant explosion-proof structure.

Therefore, an apparatus having the pressure-resistant explosion-proof structure has the following problems. That is, it is not easy to have a backup battery built thereinto, and even if a built-in backup battery is provided, it is practically impossible to perform maintenance/inspection in an explosive gas atmosphere.

The present invention has an object to provide a maintenance expert system for a measuring instrument, which is capable of, on an occasion of maintenance/inspection/repair after installation of a measuring instrument, providing assistance to a field engineer in diagnosing a cause at the time of troubleshooting.

In order to solve the above-mentioned problems, according to claim 1 of the present invention, there is provided a maintenance expert system for a measuring instrument including a flowmeter, a thermometer, a barometer, and a spectrometer (densimeter, densitometer), the measuring instrument, including:

a CPU including a plurality of internal timer counters and having a function of receiving inputs of signals from various sensors which detect a state of the measuring instrument and calculating a measured value of an object to be measured based on detection values of the various sensors;

a power supply circuit for activating (ON) or stopping (OFF) the measuring instrument;

a display unit for displaying detection input data, which is input from the various sensors to the CPU, and the measured value of the object to be measured, which is calculated by the CPU;

a real-time clock IC (RTC) connected to the CPU via a bus line, for measuring time;

an EEPROM connected to the CPU via a bus line, for storing data input to the CPU; and an FeRAM connected to the CPU via a bus line, for storing input values from the various sensors via the CPU, and storing a calculation result obtained through a calculation performed by the CPU based on the input values from the various sensors.

In order to solve the above-mentioned problems, according to claim 2 of the present invention, in the maintenance expert system for a measuring instrument, the EEPROM and the FeRAM of the flowmeter included in the measuring instrument according to claim 1 are selectively used according to data input to the CPU, data and a timing at which the calculation result is saved, or a frequency with which the calculation result is saved.

In order to solve the above-mentioned problems, according to claim 3 of the present invention, in the maintenance expert system for a measuring instrument, the display unit of the measuring instrument according to claim 1 or 2 has a function of displaying, based on a cumulative operation time period of the measuring instrument, a recommended replacement timing of components used in the measuring instrument or arrival of a maintenance/inspection timing of the measuring instrument.

In order to solve the above-mentioned problems, according to claim 4 of the present invention, in the maintenance expert system for a measuring instrument according to any one of claims 1 to 3, the measuring instrument has a function of logging the state of the measuring instrument, a function of measuring an operation time period of the measuring instrument, a function of detecting and recording a power abnormality caused by an instantaneous power failure occurring immediately after power-on, and a function of displaying an indication that the measuring instrument is in a warm-up period.

In order to solve the above-mentioned problems, according to claim 5 of the present invention, in the maintenance expert system for a measuring instrument according to any one of claims 1 to 4, the measuring instrument further includes a temperature measuring IC for measuring an internal temperature of the measuring instrument, the temperature measuring IC being connected to the CPU and accommodated in a hermetically sealed casing of the measuring instrument.

In order to solve the above-mentioned problems, according to claim 6 of the present invention, in the maintenance expert system for a measuring instrument according to claim 5, the measuring instrument has a function of monitoring and logging the internal temperature.

In order to solve the above-mentioned problems, according to claim 7 of the present invention, in the maintenance expert system for a measuring instrument, the function of logging the state of the measuring instrument in the measuring instrument according to any one of claims 4 to 6 includes:

a first function of, every time an event indicating the state of the measuring instrument occurs, in order to assign a timestamp of an elapsed time, logging elapsed operation time (cumulative time) data, which is a total operation time period of the measuring instrument, as "B data", and also logging a measured time value of the real-time clock IC (RTC) as event log data ("G data") in the FeRAM;

a second function of, in order to assign a timestamp of a time (elapsed) when power is shut off, which is one of occurring events indicating the state of the measuring instrument, recording elapsed-time save data of the measured time value of the real-time clock IC (RTC) as "A data" in the EEPROM when the power is shut off;

a third function of, as an option of the function of assigning and recording (logging) the timestamp, recording real date and real time in association therewith as "G data" in the FeRAM; and a fourth function of, when the power is shut off during operation in the optional function, recording, as a real-time timestamp, the measured time value of the real-time clock IC (RTC) as "F data" in the EEPROM.

In order to solve the above-mentioned problems, according to claim 8 of the present invention, in the maintenance expert system for a measuring instrument, the operation-time-period measuring function in the measuring instrument according to any one of claims 4 to 7 includes the function of measuring the operation time period of the measuring instrument, and in the operation-time-period measuring function, in order to cumulate the operation time period (elapsed time) immediately after the measuring instrument is activated, operation-time-period measuring data, which is obtained by performing time measurement every one hour by the internal timer counter built in the CPU, is recorded (logged) as the "B data" in the FeRAM.

In order to solve the above-mentioned problems, according to claim 9 of the present invention, in the maintenance expert system for a measuring instrument, the abnormal-power-on detecting function in the measuring instrument according to any one of claims 4 to 8 includes the function of detecting and recording (logging) the power abnormality caused by power shut-off occurring immediately after the measuring instrument is powered on, and in the abnormal-power-on detecting function: a cumulative time from immediately after the activation (immediately after the power-on) of the measuring instrument until the instantaneous power failure (OFF) is obtained through a subtraction, and when the cumulative time is short (for example, three seconds or shorter), the power abnormality is considered to have occurred; abnormal-power-on detection data, which indicates a number of times the power abnormality has occurred, is recorded (logged) as "D data" in the FeRAM; and the abnormal-power-on detection information is displayed on the display unit of the measuring instrument.

In order to solve the above-mentioned problems, according to claim 10 of the present invention, in the maintenance expert system for a measuring instrument, the warm-up-period indicating function in the measuring instrument according to any one of claims 4 to 9 includes the function of displaying the indication that the measuring instrument has just been powered on and is in the warm-up period, and in the warm-up-period indicating function, the elapsed time since the power-on of the measuring instrument is measured by the internal timer counter built in the CPU, and the indication that the measuring instrument is in the warm-up period is displayed on the display unit of the measuring instrument for a given period of time.

In order to solve the above-mentioned problems, according to claim 11 of the present invention, in the maintenance expert system for a measuring instrument, the internal-temperature monitoring/logging function in the measuring instrument according to any one of claims 6 to 10 includes the function of monitoring the temperature inside the measuring instrument hermetically sealed by the casing and logging the temperature, and in the internal-temperature monitoring/logging function: after the measuring instrument is activated, detection data of the temperature measuring IC is regularly recorded (logged), along with the timestamp, as internal-temperature log data indicating the internal temperature ("H data") in the FeRAM; an upper-limit value and a lower-limit value are provided with respect to a sample temperature, and a determination is made for the recorded (logged) internal temperature; and when a result of the determination is NG, an indication to that effect is displayed on the display unit.

In order to solve the above-mentioned problems, according to claim 12 of the present invention, in the maintenance expert system for a measuring instrument, the EEPROM according to anyone of claims 1 to 11 stores the elapsed-time save data ("A data") and elapsed-real-time save data ("F data").

In order to solve the above-mentioned problems, according to claim 13 of the present invention, in the maintenance expert system for a measuring instrument, the FeRAM according to anyone of claims 1 to 12 stores: the elapsed operation time (cumulative time) data ("B data") being the total operation time period of the measuring instrument; power-abnormality-occurrence count data ("D data") indicating the number of times the power abnormality has occurred; data ("G data") obtained by logging issuance/removal of an alert being a warning message and of an alarm calling attention, results of self-diagnosis, and power-off time; the internal-temperature log data ("H data") obtained by recording the temperature measured in the hermetically sealed measuring instrument; and an initial real-time set value ("Z data").

In order to solve the above-mentioned problems, according to claim 14 of the present invention, in the maintenance expert system for a measuring instrument, the real-time clock IC (RTC) according to any one of claims 1 to 13 switches between two modes of an elapsed-time timestamp mode and a real-time timestamp mode to perform time measurement for each of the two modes.

In order to solve the above-mentioned problems, according to claim 15 of the present invention, there is provided a maintenance expert system for a measuring instrument including a flowmeter, a thermometer, a barometer, and a spectrometer (densimeter, densitometer), the measuring instrument including a Coriolis flowmeter obtained by accommodating, in a hermetically sealed casing, a measuring instrument for determining a mass flow rate and/or a density of a fluid to be measured, the Coriolis flowmeter including:
    a CPU including a plurality of internal timer counters, and having a function of: receiving inputs of signals from various sensors which detect a state of the Coriolis flowmeter; controlling the driving means, to thereby alternately drive the flow tube at an alternate-driving frequency, which is the same as an eigen frequency of the flow tube; detecting, by an electromagnetic pickoff, a phase difference and/or an oscillation frequency proportional to a Coriolis force generated in the flow tube; and calculating a flow rate of the fluid to be measured;

a power supply circuit for activating (ON) or stopping (OFF) the Coriolis flowmeter;

a detector for detecting the Coriolis force generated in the flow tube, by alternately driving the flow tube by the driving means implemented by a combination of a coil and a magnet in the flow tube;

a display unit for displaying detection input data input from the various sensors to the CPU and the flow rate of the fluid to be measured, which is obtained through a calculation by the CPU based on the Coriolis force generated in the flow tube;

a real-time clock IC (RTC) connected to the CPU via a bus line, for measuring time;

an EEPROM connected to the CPU via a bus line, for storing data input to the CPU; and an FeRAM connected to the CPU via a bus line, for storing input values from the various sensors via the CPU, and storing a calculation result obtained through a calculation performed by the CPU based on the input values from the various sensors.

According to the present invention, it is possible to provide, on an occasion of maintenance/inspection/repair after installation of the measuring instrument, the assistance to the field engineer in diagnosing a cause at the time of troubleshooting.

Further, according to the present invention, data from each of the sensors can be stored without the provision of a built-in backup battery, and hence it is possible to open the measuring instrument for maintenance/inspection, and also to perform maintenance/inspection at any time.

Further, according to the present invention, the measuring instrument itself performs data logging, and hence, without any need to go to the place of use (place of installation), it is possible to easily grasp the situation of the site simply by having the measuring instrument itself returned to the manufacturer.

BEST MODE FOR CARRYING OUT THE INVENTION

Figure 1:
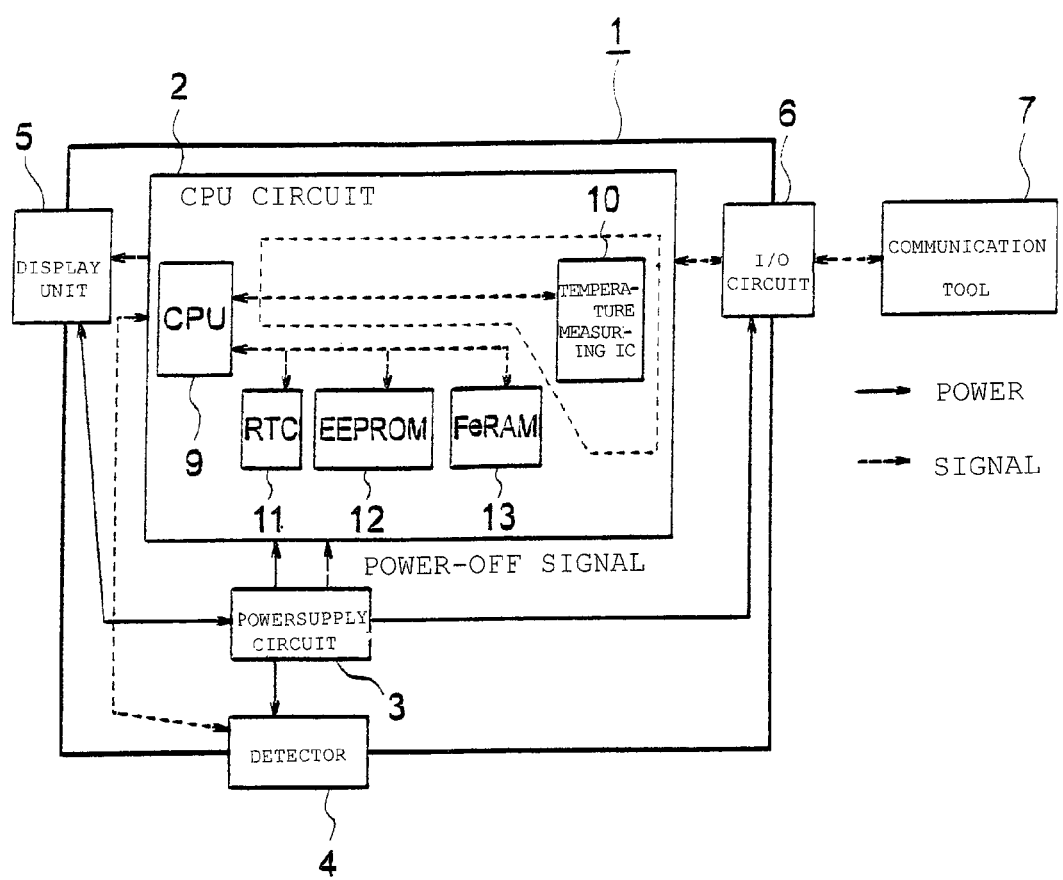
FIG. 1 is a schematic diagram of a maintenance expert system for a measuring instrument according to the present invention.

Referring to the drawings, description is given of a maintenance expert system for a measuring instrument according to embodiments, to which the present invention is applied.

The "maintenance expert system" used herein refers to a system which records information on an operation state (data on an operating condition in a normal state or an abnormal state) observed in, particularly, such a measuring instrument as a flowmeter, a thermometer, a barometer, or a spectrometer (densimeter, densitometer), and, in a case of problem occurrence in the measuring instrument, provides assistance to a field engineer in diagnosing the cause of the problem. In this description, a system which provides assistance in examining the operation state of the measuring instrument at the time of maintenance is referred to as the "maintenance expert system". Hereinafter, the same applies in this description.

First Embodiment

The maintenance expert system according to the present invention is a system which provides, with respect to a measuring instrument such as a flowmeter, a thermometer, a barometer, or a spectrometer (densimeter, densitometer), assistance to a field engineer in examining the operation state of the measuring instrument when maintenance (maintenance/inspection/repair) is performed for the measuring instrument.

In this embodiment, description is given by taking as an example a Coriolis flowmeter, which is a typical flowmeter having a measurement control function for acquiring the mass flow rate and/or the density of a fluid to be measured.

FIG. 1 is a schematic diagram of the maintenance expert system for a measurement control apparatus (corresponding to the "measuring instrument" in the "CLAIMS", and the same applies hereinafter) in the Coriolis flowmeter according to the present invention. In other words, FIG. 1 illustrates a configuration diagram of the measuring instrument which executes the maintenance expert system.

In the figure, a measuring instrument 1 constituting the maintenance expert system includes a CPU circuit 2, a power supply circuit 3, a detector 4 for detecting a Coriolis force acting on a flow tube, a display unit 5 for displaying necessary information such as a measured value, and an input/output (I/O) circuit 6.

In the figure, reference numeral 7 denotes a communication tool such as a communication control apparatus for remote control.

Figure 2:
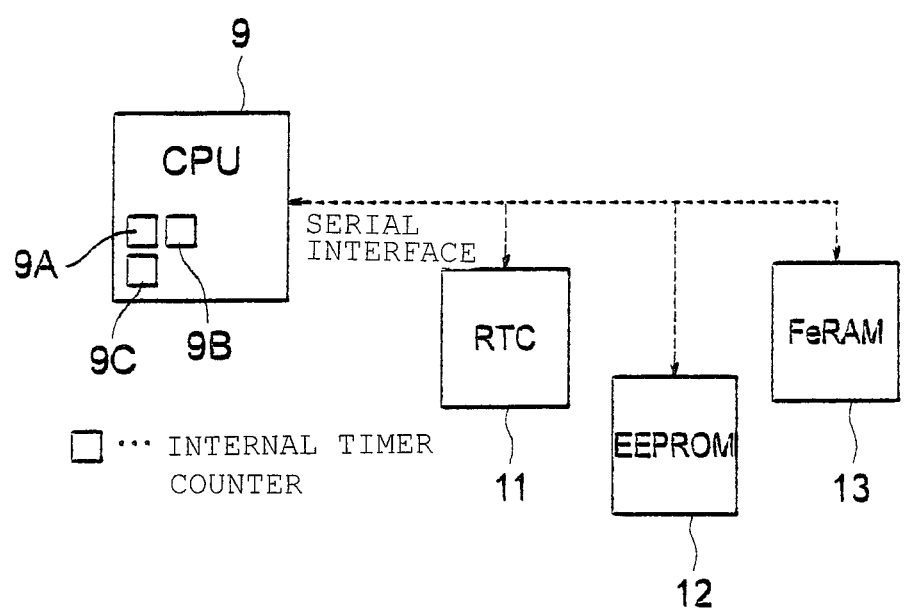
FIG. 2 is a circuit configuration diagram of a CPU of the maintenance expert system for a measuring instrument, which is illustrated in FIG. 1, according to a first embodiment.

FIG. 2 is a configuration diagram of the CPU circuit 2 of the maintenance expert system in the Coriolis flowmeter, which is illustrated in FIG. 1, according to the first embodiment.

Referring to FIG. 1, the CPU circuit 2 includes a CPU 9 provided with a function of: receiving inputs of signals from various sensors; controlling driving means implemented by a combination of a coil and a magnet, to thereby alternately drive the flow tube at an alternate-driving frequency, which is the same as the eigen frequency of the flow tube; detecting, by an electromagnetic pickoff, a phase difference and/or an oscillation frequency proportional to the Coriolis force generated in the flow tube when the flow tube is alternately driven in the direction of rotation; and calculating the flow rate of the fluid to be measured which is flowing through the flow tube.

The power supply circuit 3 is a device for activating (ON) or stopping (OFF) the Coriolis flowmeter. The power supply circuit 3 is connected to the CPU circuit 2, and when the power supply circuit 3 is powered on, power is supplied to the CPU circuit 2, thereby activating the CPU circuit 2. With the activation of the CPU circuit 2, the Coriolis flowmeter is driven to start measuring the flow rate of the fluid to be measured which is flowing through the flow tube.

The detector 4 detects the Coriolis force generated in the flow tube, by alternately driving the flow tube by the driving means implemented by the combination of the coil and the magnet in the flow tube. The detector 4 is driven by the power supplied from the power supply circuit 3, and the Coriolis force generated and detected in the flow tube is sent to the CPU circuit 2 as detection data.

The display unit 5 displays the flow rate of the fluid to be measured, which is obtained by calculating, by the CPU circuit 2, detection input data from the various sensors based on the Coriolis force generated in the flow tube. The display unit 5 may be configured by, for example, an LED display, but in recent times, liquid crystal is used. In this embodiment, too, the display unit 5 is configured by a liquid crystal display.

The input/output (I/O) circuit 6 is a circuit for inputting data detected by the various sensors to the CPU circuit 2, and exchanging data between an external apparatus and the CPU circuit 2. The input/output (I/O) circuit 6 is driven by the power supplied from the power supply circuit 3, thereby receiving data from the various sensors and exchanging data with the external apparatus.

The communication tool 7 is located at a position distanced from the Coriolis flowmeter, and exchanges data with the CPU circuit 2 via a communication cable or the like. The communication tool 7 is capable of controlling the CPU circuit 2 from a remote location, and is capable of substantially controlling the Coriolis flowmeter.

As illustrated in FIG. 2, the CPU circuit 2 is provided with the CPU 9, and the CPU 9 is provided with internal timer counters 9A, 9B, and 9C. Further, as an additional function, a temperature measuring IC 10 is connected to the CPU 9 via a bus line (not shown). Further, a real-time clock IC (RTC) 11, an EEPROM 12 being a rewritable non-volatile memory, and an FeRAM (ferroelectric memory) 13 being a non-volatile semiconductor memory which utilizes ferroelectric hysteresis to associate positive and negative spontaneous polarizations with "1" and "0" are connected to the CPU 9 via bus lines. The real-time clock IC (RTC) 11, the EEPROM 12, and the FeRAM (ferroelectric memory) 13 are connected to the CPU 9 by using a serial interface.

The primary function of the maintenance expert system 1 configured as described above is data logging, and a time measuring system plays an important role. In this embodiment, a built-in battery (backup battery) is not provided, and hence though the real-time clock IC (RTC) 11 is provided, it is impossible to perform truly real-time time measurement. To address this, in this embodiment, the time measurement is executed using two modes of an elapsed-time timestamp mode and a real-time timestamp mode.

In the elapsed-time timestamp mode, the time measurement is started at the power-on from 0:00:00 (0 hours, 00 minutes, 00 seconds), and is continued while the flowmeter (converter) is operating. This function is disabled in the real-time timestamp mode to be described next.

In the real-time timestamp mode, after the converter is powered on, an operator sets actual date and real time (hours, minutes, seconds) in advance, and then starts the time measurement (flowmeter). The time measurement thus started is continued until the power is turned off or until the mode is shifted to the elapsed-time timestamp mode.

Switchover between the two modes is performed by the operator using the communication tool 7 or the like.

In this embodiment, the EEPROM 12 and the FeRAM (ferroelectric memory) 13 are provided, and different pieces of data are stored therein.

The EEPROM 12 stores elapsed-time save data (referred to as "A data") and elapsed-real-time save data (referred to as "F data").

The FeRAM (ferroelectric memory) 13 stores: elapsed operation time (cumulative time) data (referred to as "B data") being a total operation time period of the flowmeter (converter); power-abnormality-occurrence count data (referred to as "D data") indicating the number of times a power abnormality has occurred; data (referred to as "G data") obtained by logging the issuance/removal of an alert being a warning message and of an alarm calling attention, results of self-diagnosis, and power-off time; internal-temperature log data (referred to as "H data") obtained by recording the temperature measured in the hermetically sealed flowmeter (converter); and an initial real-time set value (referred to as "Z data").

The maintenance expert system configured as described above has a function of logging the state of the flowmeter, a function of monitoring/logging the internal temperature, a function of measuring the operation time period of the flowmeter, a function of detecting and recording a power abnormality caused by an instantaneous power failure occurring immediately after the power-on, and a function of displaying an indication that the flowmeter is in a warm-up period.

Next, those functions are described.

(1) Flowmeter-State Logging Function

This is the function of logging the state of the flowmeter, and includes the following functions.

a) Every time an event indicating the state of the flowmeter occurs, in order to assign a timestamp of the elapsed time, the elapsed operation time (cumulative time) data, which is the total operation time period of the flowmeter (converter), is logged as the "B data" in the FeRAM (ferroelectric memory) 13 being the non-volatile memory. Along with the logging of the elapsed operation time (cumulative time) data ("B data"), a measured time value of the real-time clock IC (RTC) 11 is also logged as event log data ("G data") in the FeRAM (ferroelectric memory) 13.

b) In order to assign a timestamp of the time (elapsed) when the power is shut off, which is one of occurring events indicating the state of the flowmeter, the elapsed-time save data of the measured time value of the real-time clock IC (RTC) 11 is recorded as the "A data" in the EEPROM 12 being the non-volatile memory when the power is shut off.

c) As an option of the function of assigning and recording (logging) the timestamp, the real date and the real time are recorded in association therewith as the "G data" in the FeRAM (ferroelectric memory) 13 being the non-volatile memory.

d) When the power is shut off during the operation in the optional function, as a real-time timestamp, the measured time value of the real-time clock IC (RTC) 11 is recorded as the "F data" in the EEPROM 12 being the non-volatile memory.

(2) Operation-Time-Period Measuring Function

This is the function of measuring the operation time period of the flowmeter (converter). In order to cumulate the operation time period (elapsed time) immediately after the flowmeter (converter) is activated, the operation-time-period measuring data, which is obtained by performing the time measurement every one hour by the internal timer counter built in the CPU 9, is recorded (logged) as the "B data" in the FeRAM (ferroelectric memory) 13 being the non-volatile memory. The operation-time-period measuring data is counted up in the FeRAM (ferroelectric memory) 13, and the information is updated.

(3) Abnormal-Power-On Detecting Function

This is the function of detecting and recording (logging) a power abnormality which occurs when the power is shut off immediately after the flowmeter (converter) is powered on. The cumulative time from immediately after the activation (immediately after the power-on) of the flowmeter (converter) until the power is shut off is obtained through a subtraction, and when the cumulative time is short (for example, three seconds or shorter), a power abnormality is considered to have occurred. Then, the abnormal-power-on detection data, which indicates the number of times a power abnormality has occurred, is recorded (logged) as the "D data" in the FeRAM (ferroelectric memory) 13 being the non-volatile memory.

The information detected by the abnormal-power-on detecting function is displayed on the display unit 5 of the flowmeter (converter).

(4) Warm-Up-Period Indicating Function

This is the function of displaying an indication that the flowmeter (converter) has just been powered on and is in the warm-up period. The elapsed time since the power-on of the flowmeter (converter) is measured by the internal timer counter built in the CPU 9, and the indication that the flowmeter (converter) is in the warm-up period is displayed on the display unit 5 of the flowmeter (converter) for a given period of time.

(5) Operation-Time-Period Measuring Function

A threshold is provided for the cumulative elapsed time of the flowmeter (converter), and when the cumulative elapsed time obtained by cumulating the operation time period measured every one hour by the internal timer counter built in the CPU 9 has reached the threshold, a message recommending an inspection of the flowmeter (converter) is displayed on the display unit 5.

Next, description is given of operation of the maintenance expert system with reference to a flow chart.

Figure 3:
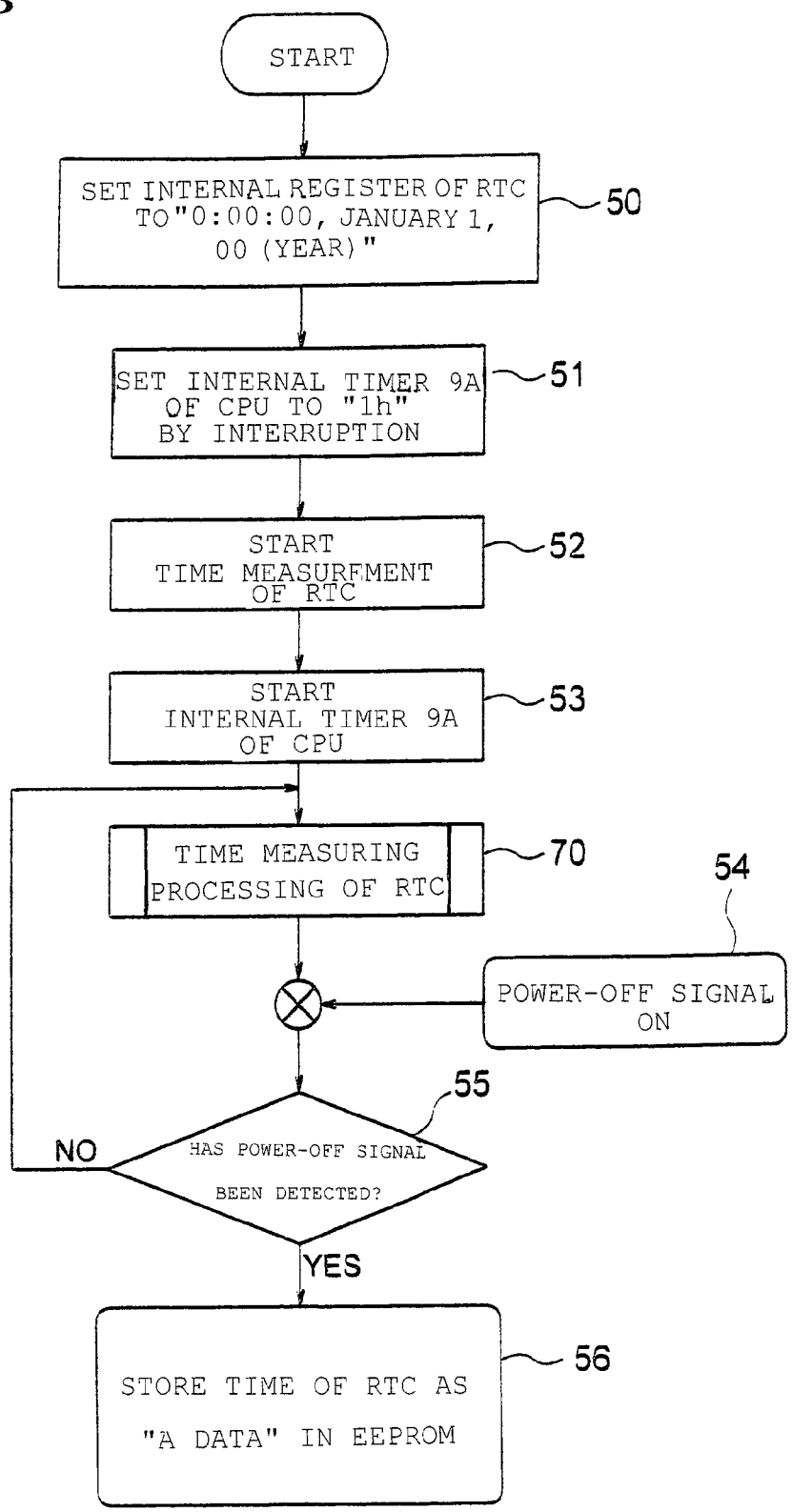
FIG. 3 is a basic flow chart of a time measuring system in an elapsed-time timestamp mode.

FIG. 3 illustrates a basic flow chart of the time measuring system in the elapsed-time timestamp mode.

Referring to FIG. 3, when the flowmeter (converter) is powered on, the flow starts. After the start, first, in Step 50, the time of an internal register of the real-time clock IC (RTC) 11 is set to "0:00:00 (0 hours, 00 minutes, 00 seconds), January 1, 00 (year)".

After the time of the internal register of the real-time clock IC (RTC) 11 is set in Step 50, in Step 51, an interrupt occurs in the internal timer counter 9A built in the CPU 9, and the internal timer counter 9A is set to "1 h" (one hour).

After the internal timer counter 9A is set to "1 h" (one hour) in Step 51, in Step 52, the real-time clock IC (RTC) 11 in which the time has been set to "0:00:00 (0 hours, 00 minutes, 00 seconds), January 1, 00 (year)" starts the time measurement from "0:00:00 (0 hours, 00 minutes, 00 seconds), January 1, 00 (year)".

After the real-time clock IC (RTC) 11 starts the time measurement in Step 52, in Step 53, the internal timer counter 9A, in which "1 h" (one hour) has been set, starts.

Figure 4:
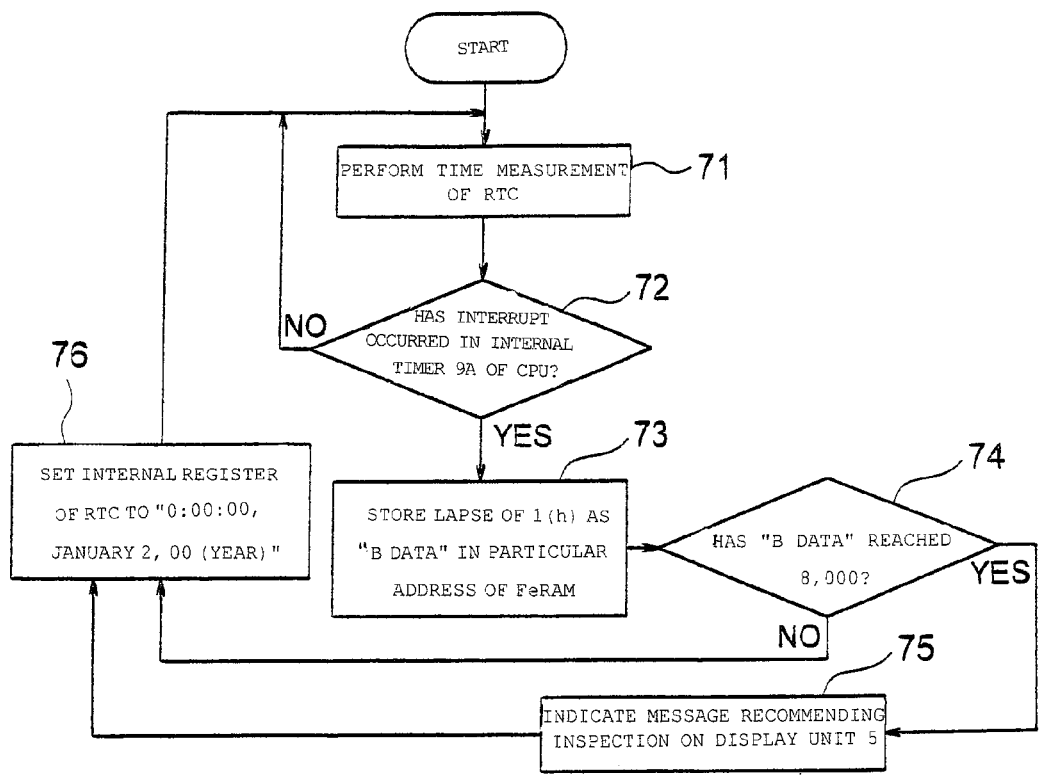
FIG. 4 is a flow chart of time measuring processing of a real-time clock IC (RTC) in the elapsed-time timestamp mode.

After the internal timer counter 9A starts in Step 53, in Step 70, time measuring processing of the real-time clock IC (RTC) 11 is performed. The time measuring processing of the real-time clock IC (RTC) 11 is executed in accordance with a flow chart of the time measuring processing of the RTC IC (real-time clock) 11 in the elapsed-time timestamp mode, which is illustrated in FIG. 4.

Specifically, after the start of the time measuring processing of the RTC IC (real-time clock) 11, first, the time measurement of the RTC IC (real-time clock) 11 is performed in Step 71, and then, it is determined in Step 72 whether or not an interrupt has occurred in the internal timer counter 9A built in the CPU 9. When it is determined in Step 72 that there is no interrupt occurring in the internal timer counter 9A built in the CPU 9, the processing returns to Step 71, in which the time measurement of the RTC IC (real-time clock) 11 is performed while waiting for an interrupt to occur in the internal timer counter 9A built in the CPU 9.

When it is determined in Step 72 that there is an interrupt occurring in the internal timer counter 9A built in the CPU 9, in Step 73, data indicating a lapse of one hour is stored as the "B data" in a particular address of the FeRAM (ferroelectric memory) 13. Specifically, in the particular address of the FeRAM (ferroelectric memory) 13, a lapse of one hour is added to the already-stored elapsed time every one hour, and the resultant is stored as the operation time period of the flowmeter (converter).

After the lapse of one hour is added to the elapsed time already stored in the particular address of the FeRAM (ferroelectric memory) 13, and the resultant is stored as the operation time period in Step 73, it is determined in Step 74 whether or not the elapsed time ("B data") stored in the particular address of the FeRAM (ferroelectric memory) 13 has reached a preset time period (for example, 8,000 hours). When it is determined in Step 74 that the elapsed time stored in the particular address of the FeRAM (ferroelectric memory) 13 has reached the preset time period (for example, 8,000 hours), the message recommending an inspection is indicated on the display unit 5 in Step 75, and the processing proceeds to Step 76.

On the other hand, when it is determined in Step 74 that the cumulative elapsed time ("B data") stored in the particular address of the FeRAM (ferroelectric memory) 13 has not reached the preset time period (for example, 8,000 hours), the processing proceeds to Step 76.

After the message recommending an inspection is indicated on the display unit 5 in Step 75, or after it is determined in Step 74 that the cumulative elapsed time ("B data") stored in the particular address of the FeRAM (ferroelectric memory) 13 has not reached the preset time period (for example, 8,000 hours), in Step 76, the time of the internal register of the real-time clock IC (RTC) 11 is set to "0:00:00 (0 hours, 00 minutes, 00 seconds), January 2, 00 (year)", and the processing returns to Step 71.

In this manner, the time measurement of the RTC IC (real-time clock) 11 is continuously performed, and the cumulative elapsed time ("B data") stored in the particular address of the FeRAM (ferroelectric memory) 13 is kept being recorded (logged).

The flowmeter (converter) may be powered off for some reason (for example, the operator finishing measuring the flow rate, a system failure due to an abnormality in the apparatus, etc.). In this case, in Step 54 of the basic flow chart of the time measuring system in the elapsed-time timestamp mode which is illustrated in FIG. 3, a power-off signal, that is, a shutoff signal is issued.

Thus, in the basic flow of the time measuring system in the elapsed-time timestamp mode which is illustrated in FIG. 3, it is determined in Step 55 and Step 54 whether or not the power-off signal, that is, the shutoff signal for the flowmeter (converter) has been issued, that is, whether or not the power-off signal has been detected when the flow of the time measuring processing of the RTC IC (real-time clock) 11 in the elapsed-time timestamp mode, which is illustrated in FIG. 4, is being executed in Step 70.

When it is determined in Step 55 that the power-off signal for the flowmeter (converter) has not been detected, the processing returns to Step 70, in which the flow of the time measuring processing of the RTC IC (real-time clock) 11 in the elapsed-time timestamp mode, which is illustrated in FIG. 4, continues to be executed. On the other hand, when it is determined in Step 55 that the power-off signal for the flowmeter (converter) has been detected, in Step 56, the elapsed time represented by the measured time value of the real-time clock IC (RTC) 11 obtained when the flowmeter (converter) is shut off is stored as save data ("A data") in the EEPROM 12 being the non-volatile memory.

Figure 5:
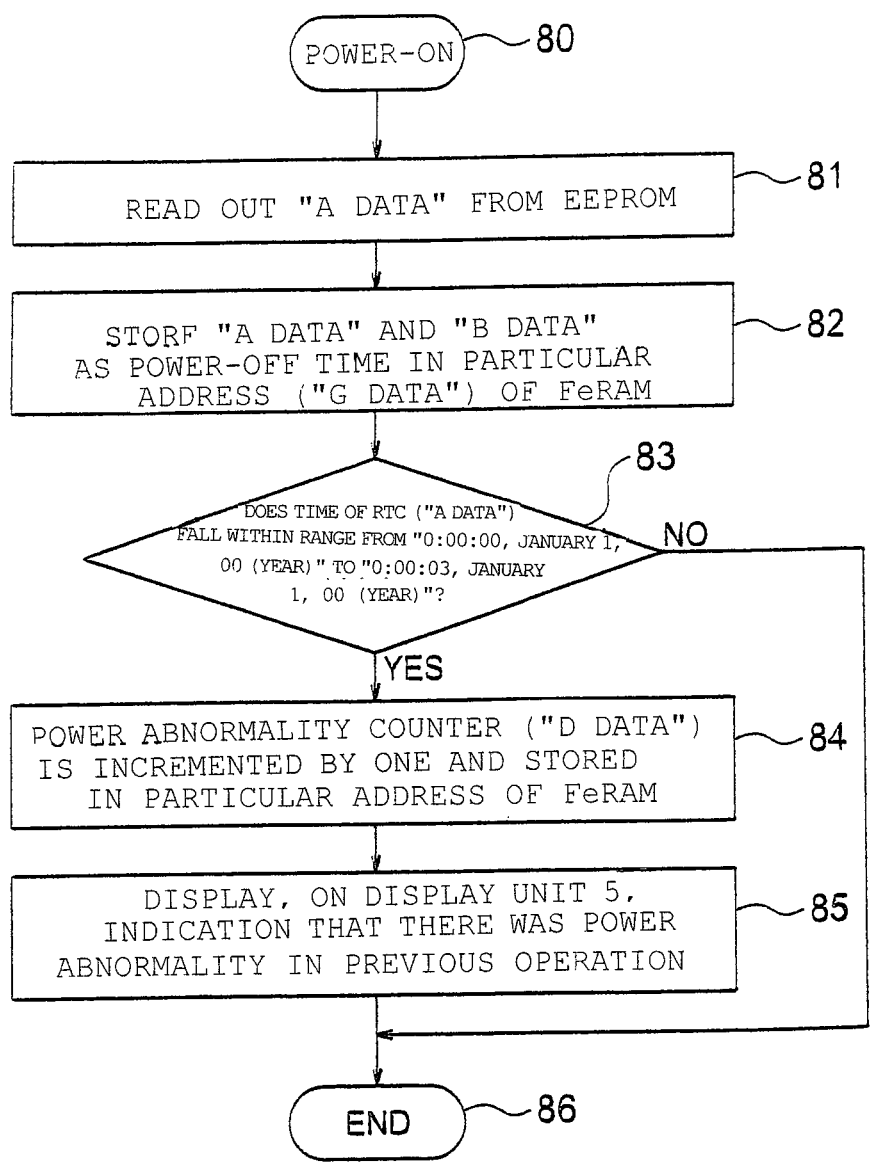
FIG. 5 is a flow chart for detecting abnormal power-on in the elapsed-time timestamp mode.

FIG. 5 illustrates a flow chart for detecting a power abnormality in the elapsed-time timestamp mode. Specifically, the flow chart for detecting abnormal power-on which is illustrated in FIG. 5 is a processing flow used when an instantaneous power failure (OFF) has occurred in the flowmeter (converter) due to abnormal power-on instantaneously after the flowmeter (converter) is powered on.

First, in Step 80, the flowmeter (converter) is powered on, and a flow for detecting an instantaneous power abnormality is started in the elapsed-time timestamp mode.

After the start of the flow in Step 80, first, in Step 81, the save data ("A data") of the elapsed time represented by the measured time value of the real-time clock IC (RTC) 11 obtained when the flowmeter (converter) is shut off, which is stored in the EEPROM 12, is read out.

In Step 81, when there is no save data ("A data") of the elapsed time represented by the measured time value of the real-time clock IC (RTC) 11 obtained when the flowmeter (converter) is shut off, which is stored in the EEPROM 12, the flow for detecting abnormal power-on in the elapsed-time timestamp mode, which is illustrated in FIG. 5, is disabled.

When the save data ("A data") of the elapsed time, which is stored in the EEPROM 12, is read out in Step 81, in Step 82, the elapsed time data ("B data") is added with the measured time value of the real-time clock IC (RTC) 11 obtained when the flowmeter (converter) is shut off, that is, the save data ("A data") of the elapsed time, and the resultant is stored in the particular address ("G data") of the FeRAM (ferroelectric memory) 13.

When the save data ("A data") of the elapsed time represented by the measured time value of the real-time clock IC (RTC) 11 obtained when the flowmeter (converter) is shut off is added with the elapsed time data ("B data"), and the resultant is stored in the particular address ("G data") of the FeRAM (ferroelectric memory) 13 in Step 82, it is determined in Step 83 whether or not the time period measured by the real-time clock IC (RTC) 11 until the power is shut off after the flowmeter (converter) is powered on is equal to or shorter than a preset time period (for example, three seconds) from the time of "0:00:00 (0 hours, 00 minutes, 00 seconds), January 1, 00 (year)" set when the flowmeter (converter) is powered on.

When it is determined in Step 83 that the time period until the flowmeter (converter) is powered off is not equal to or shorter than the preset time period (for example, three seconds), the flow for detecting abnormal power-on in the elapsed-time timestamp mode, which is illustrated in FIG. 5, is terminated.

On the other hand, when it is determined in Step 83 that the time period until the flowmeter (converter) is powered off is equal to or shorter than the preset time period (for example, three seconds), in Step 84, the power-abnormality-occurrence count is incremented by one, and the resultant is stored in a power abnormality counter ("D data"), which is in a particular address of the FeRAM (ferroelectric memory) 13.

When the power-abnormality-occurrence count is incremented by one, and the resultant is stored in the particular address of the FeRAM (ferroelectric memory) 13 in Step 84, in Step 85, an indication that there was a power abnormality in the previous operation is displayed on the display unit 5, and the flow for detecting instantaneous abnormal power-on in the elapsed-time timestamp mode, which is illustrated in FIG. 5, is terminated.

Figure 6:
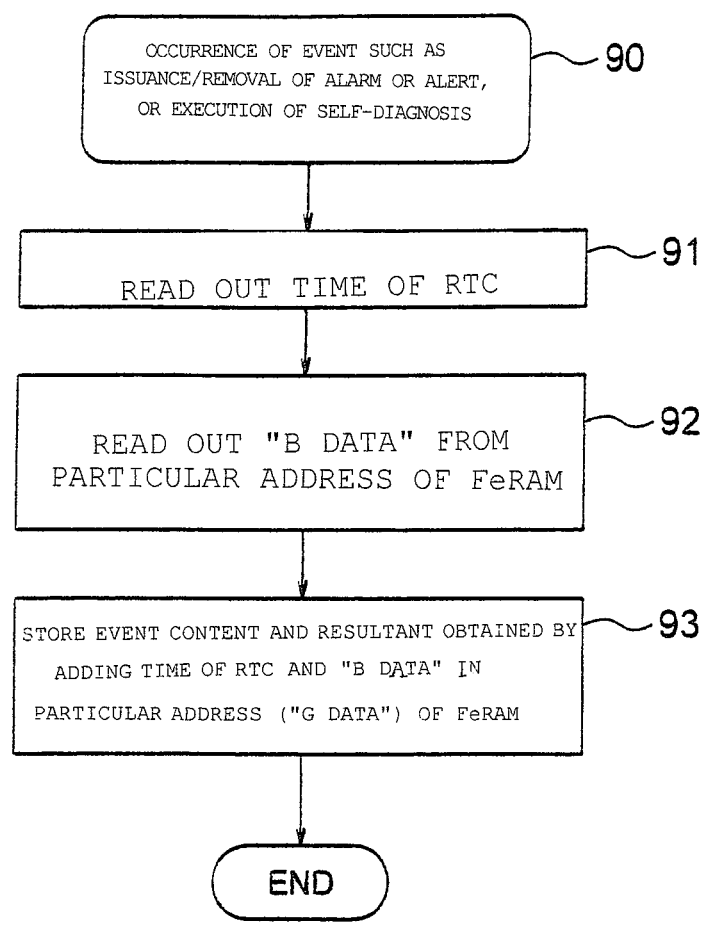
FIG. 6 is a logging flow chart used when an event (for example, error) has occurred in the elapsed-time timestamp mode.

FIG. 6 illustrates an error-logging flow chart in the elapsed-time timestamp mode. Specifically, the error-logging flow chart of FIG. 6 is a processing flow chart used when the operation state (the issuance/stopping of an alarm or an alert, results of self-diagnosis, etc.) of the apparatus is logged (recorded) in the elapsed-time timestamp mode.

First, when such an event as the issuance/removal of an alarm or an alert, or the execution of the self-diagnosis has occurred in the flowmeter (converter) in Step 90, in Step 91, the time measured by the real-time clock IC (RTC) 11 at the time of the occurrence of the event in the flowmeter (converter) is read out.

After the time measured by the real-time clock IC (RTC) 11 is read out in Step 91, in Step 92, the elapsed time ("B data") stored in the particular address of the FeRAM (ferroelectric memory) 13 is read out. After the elapsed time ("B data") is read out in Step 92, in Step 93, the content (the issuance/removal of an alarm or an alert, the execution of the self-diagnosis, etc.) of the event which has occurred in the flowmeter (converter), and a result obtained by adding the time measured by the real-time clock IC (RTC) 11 at the time of the occurrence of the event to the cumulative elapsed operation time ("B data") of the flowmeter (converter), which is read out from the particular address of the FeRAM (ferroelectric memory) 13, are stored in the particular address ("G data") of the FeRAM (ferroelectric memory) 13. Then, the error logging flow in the elapsed-time timestamp mode, which is illustrated in FIG. 6, is terminated.

The power-off time of the flowmeter (converter) is also stored in the particular address ("G data") of the FeRAM (ferroelectric memory) 13. As the power-off time, a resultant of adding the elapsed time data ("B data") and the save data ("A data") of the elapsed time represented by the measured time value of the real-time clock IC (RTC) 11 obtained when the flowmeter (converter) is shut off immediately after the power-on is stored (see Step 82 of FIG. 5). In this embodiment, up to 20 data items can be stored in the particular address ("G data") of the FeRAM (ferroelectric memory) 13, and new data items which come 21st and thereafter are overwritten onto the first data item, which has been stored first.

Further, in this embodiment, the measurement time of the real-time clock IC (RTC) 11 is obtained through a calculation performed by discarding the year, the date, and the hour of the time "0:00:00 (0 hours, 00 minutes, 00 seconds), January 1, 00 (year)" set in the real-time clock IC (RTC) 11. In other words, only "00:00 (00 minutes, 00 seconds)" is used as the measurement time of the real-time clock IC (RTC) 11.

Figure 7:
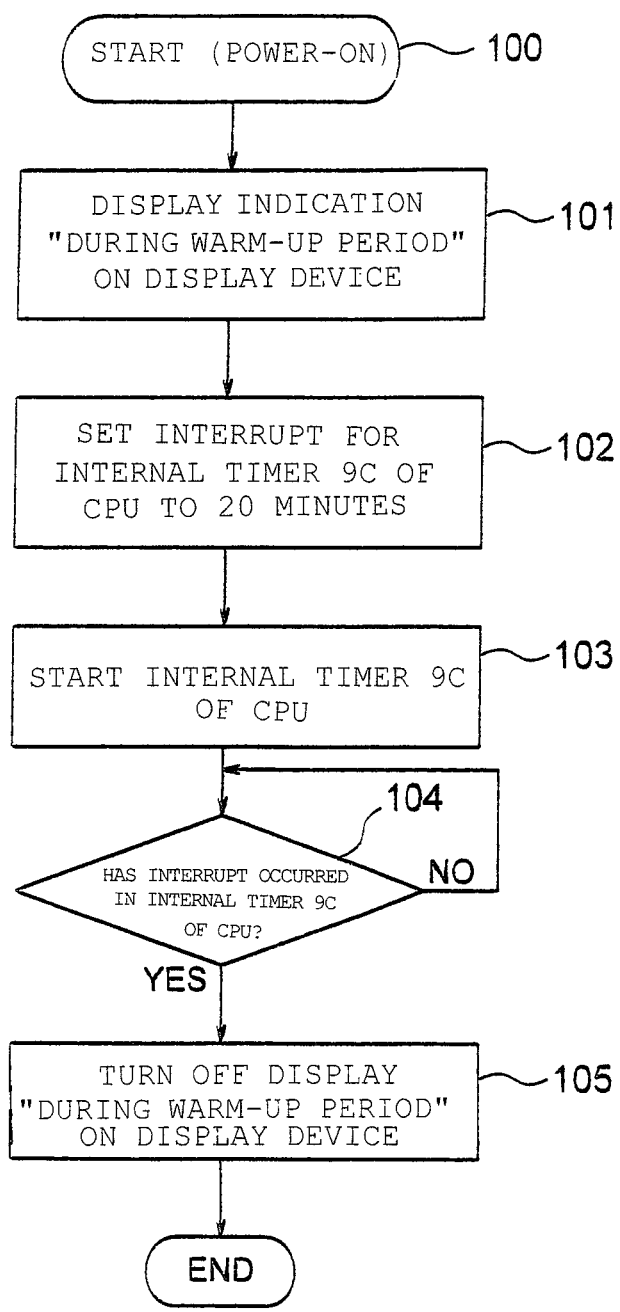
FIG. 7 is a basic flow chart of a function of displaying an indication that a measuring instrument is in a warm-up period.

FIG. 7 illustrates a basic flow chart of the function of displaying an indication that the converter (flowmeter) is in the warm-up period. Specifically, the basic flow chart of the warm-up-period indicating function, which is illustrated in FIG. 7, is a processing flow chart used when an indication that the flowmeter is in the warm-up period is displayed so as to prompt the user to give sufficient consideration to using detection data obtained immediately after the flowmeter (converter) is started up. This is because the flowmeter (converter) itself is not stable immediately after the flowmeter (converter) is started up (activated), and thus there may occur an error in the detection data.

The basic flow chart of the warm-up-period indicating function, which is illustrated in FIG. 7, starts when the power is turned on in Step 100. After the start by the power-on in Step 100, in Step 101, the message indicating that the flowmeter (converter) is in the warm-up period is displayed on the display unit 5.

After the message indicating that the flowmeter (converter) is in the warm-up period is displayed on the display unit 5 in Step 101, in Step 102, a setting is made so that an interrupt occurs in the internal timer counter 9C at fixed time intervals (in this embodiment, an interrupt signal is issued every 20 minutes).

Then, after the setting is made in Step 102 so that an interrupt occurs in the internal timer counter 9C at the fixed time intervals (in this embodiment, every 20 minutes), the internal timer counter 9C is started in Step 103.

After the internal timer counter 9C is started in Step 103, it is determined in Step 104 whether or not an interrupt has occurred in the internal timer counter 9C. When it is determined in Step 104 that an interrupt has not occurred in the internal timer counter 9C, the processing does not proceed until an interrupt occurs in the internal timer counter 9C.

On the other hand, when it is determined in Step 104 that an interrupt has occurred in the internal timer counter 9C, in Step 105, the message indicating that the flowmeter (converter) is in the warm-up period, which is displayed on the display unit 5, is turned off, and the basic flow of the warm-up-period indicating function, which is illustrated in FIG. 7, is terminated.

Figure 8:
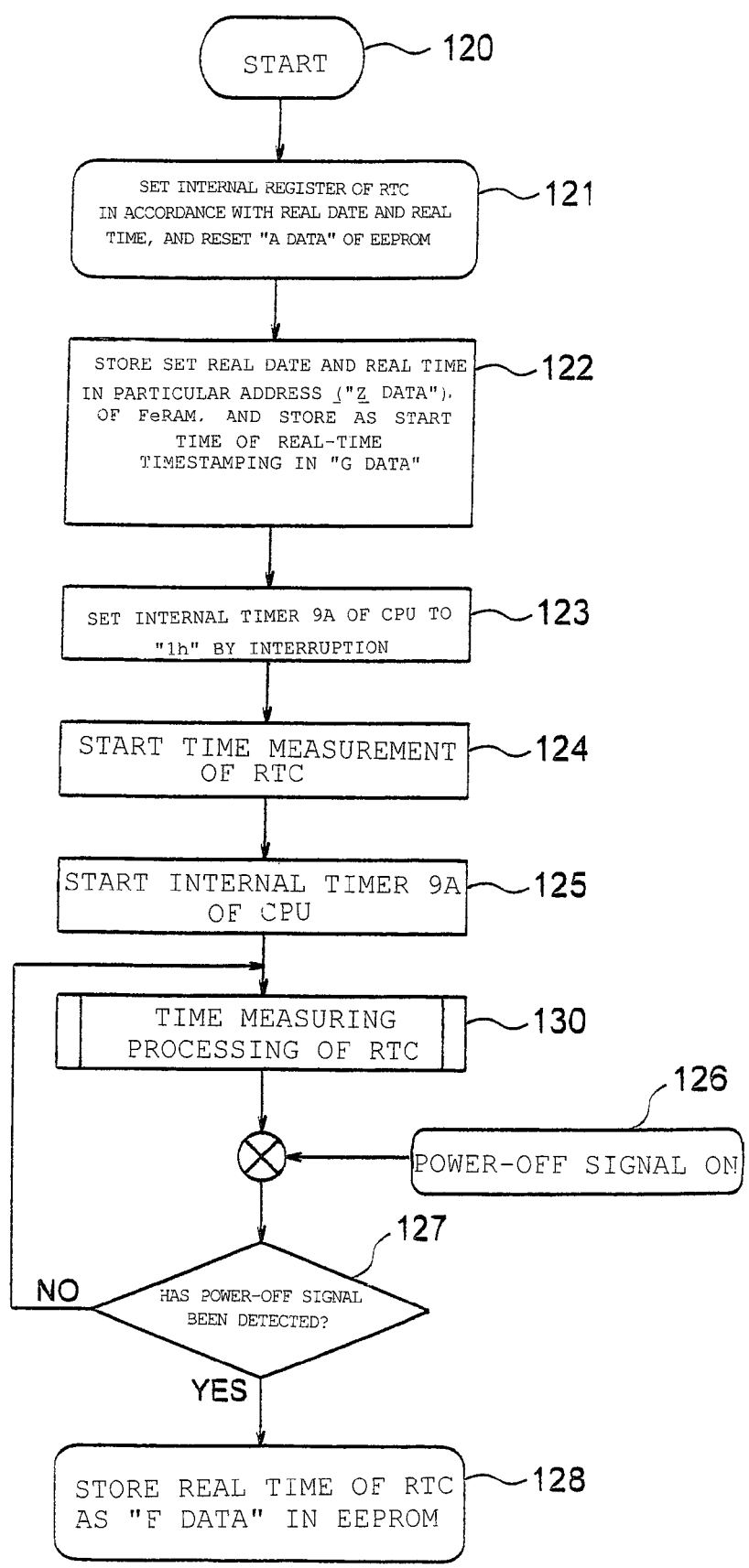
FIG. 8 is a basic flow chart of the time measuring system in a real-time timestamp mode.

FIG. 8 illustrates a basic flow chart of the time measuring system in the real-time timestamp mode.

In Step 120, mode switching is set in the flowmeter (converter), thereby starting the flow. After the flow is started in Step 120, in Step 121, the time of the internal register of the real-time clock IC (RTC) 11 is set in accordance with the real date and the real time. Along with the setting of the real date and the real time, the save data ("A data") of the elapsed time, which is the measured time value of the real-time clock IC (RTC) 11, is reset.

After the real date and the real time are set in the internal register of the real-time clock IC (RTC) 11 in Step 121, in Step 122, the real date and the real time set in the internal register of the real-time clock IC (RTC) 11 are stored in a particular address ("Z data") of the FeRAM (ferroelectric memory) 13.

When the real date and the real time set in the internal register of the real-time clock IC (RTC) 11 are stored in the particular address ("Z data") of the FeRAM (ferroelectric memory) 13, at the same time, the timestamping of the real date and the real time set in the internal register of the real-time clock IC (RTC) 11 is started. Then, the start time of the timestamping is stored in the particular address ("G data") of the FeRAM (ferroelectric memory) 13.

After the real date and the real time are stored in the particular address ("Z data") of the FeRAM (ferroelectric memory) 13 in Step 122, in Step 123, an interrupt occurs in the internal timer counter 9A built in the CPU 2, and the internal timer counter 9A is set to "1 h" (one hour).

After the internal timer counter 9A is set to "1 h" (one hour) in Step 123, in Step 124, the real-time clock IC (RTC) 11 starts the time measurement from the real date and the real time.

After the real-time clock IC (RTC) 11 starts the time measurement in Step 124, in Step 125, the internal timer counter 9A, in which "1 h" (one hour) has been set, starts.

Figure 9:
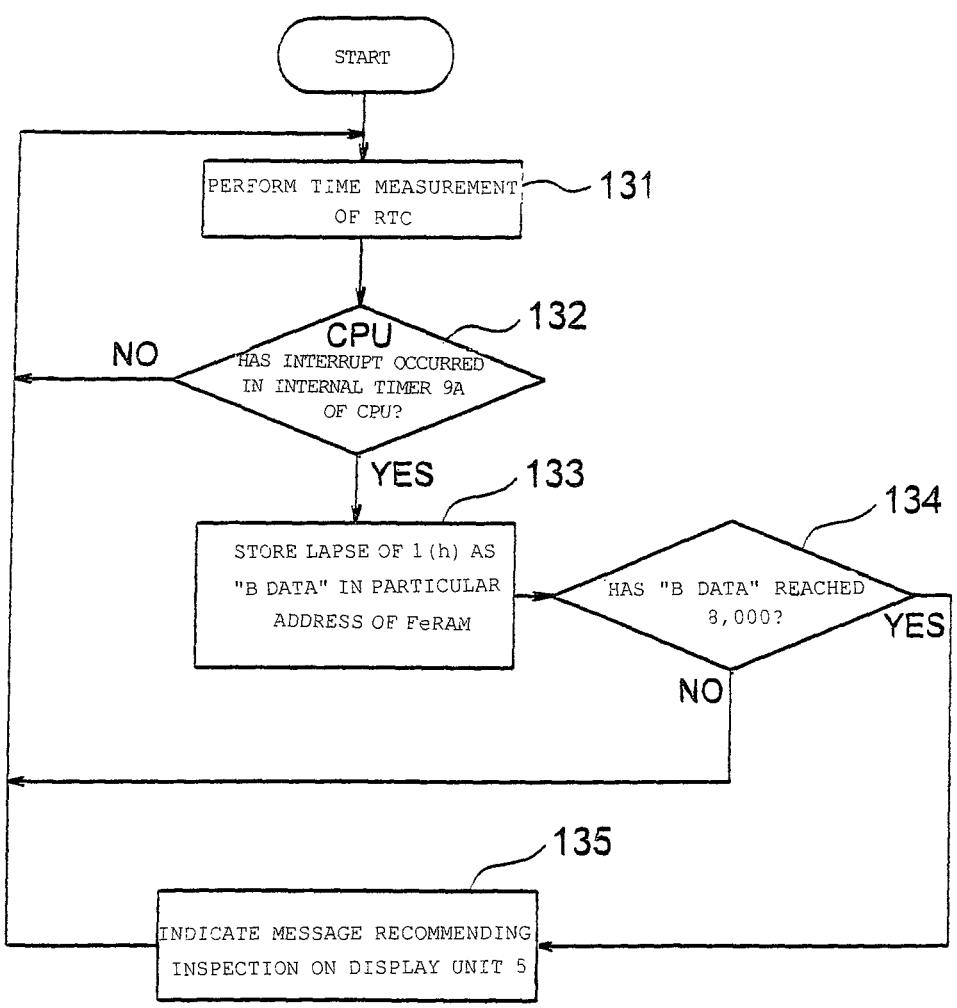
FIG. 9 is a flow chart of time measuring processing of the real-time clock IC (RTC) in the real-time timestamp mode.

After the internal timer counter 9A starts in Step 125, in Step 130, time measuring processing of the real-time clock IC (RTC) 11 is performed. The time measuring processing of the real-time clock IC (RTC) 11 is executed in accordance with a flow chart of the time measuring processing of the real-time clock IC (RTC) 11 in the real-time timestamp mode, which is illustrated in FIG. 9.

Specifically, after the start of the time measuring processing of the real-time clock IC (RTC) 11, first, the time measurement of the real-time clock IC (RTC) 11 is performed in Step 131, and then, it is determined in Step 132 whether or not an interrupt has occurred in the internal timer counter 9A built in the CPU 9. When it is determined in Step 132 that there is no interrupt occurring in the internal timer counter 9A built in the CPU 9, the processing returns to Step 131, in which the time measurement of the real-time clock IC (RTC) 11 is performed while waiting for an interrupt to occur in the internal timer counter 9A built in the CPU 9.

When it is determined in Step 132 that there is an interrupt occurring in the internal timer counter 9A built in the CPU 9, in Step 133, data indicating a lapse of one hour is stored as the "B data" in a particular address of the FeRAM (ferroelectric memory) 13. Specifically, in the particular address of the FeRAM (ferroelectric memory) 13, a lapse of one hour is added to the already-stored elapsed time every one hour, and the resultant is stored as the operation time period of the flowmeter (converter).

After the lapse of one hour is added to the elapsed time already stored in the particular address of the FeRAM (ferroelectric memory) 13, and the resultant is stored as the operation time period in Step 133, it is determined in Step 134 whether or not the elapsed time ("B data") stored in the particular address of the FeRAM (ferroelectric memory) 13 has reached a preset time period (for example, 8,000 hours).

When it is determined in Step 134 that the elapsed time stored in the particular address of the FeRAM (ferroelectric memory) 13 has not reached the preset time period (for example, 8,000 hours), the processing returns to Step 131.

On the other hand, when it is determined in Step 134 that the elapsed time stored in the particular address of the FeRAM (ferroelectric memory) 13 has reached the preset time period (for example, 8,000 hours), the message recommending an inspection is indicated on the display unit 5 in Step 135, and the processing returns to Step 131.

In this manner, the time measurement of the real-time clock IC (RTC) 11 is continuously performed, and the cumulative elapsed time ("B data") stored in the particular address of the FeRAM (ferroelectric memory) 13 is kept being recorded (logged).

The flowmeter (converter) may be powered off for some reason (for example, the operator finishing measuring the flow rate, a system failure due to an abnormality in the apparatus, etc.). In this case, in Step 127 of the basic flow chart of the time measuring system in the real-time timestamp mode which is illustrated in FIG. 8, a power-off signal, that is, a shutoff signal is issued.

Thus, in the basic flow chart of the time measuring system in the real-time timestamp mode which is illustrated in FIG. 8, it is determined in Step 127 and Step 126 whether or not the power-off signal, that is, the shutoff signal for the flowmeter (converter) has been issued, that is, whether or not the power-off signal has been detected when the flow of the time measuring processing of the real-time clock IC (RTC) 11 in the real-time timestamp mode, which is illustrated in FIG. 8, is being executed in Step 130.

When it is determined in Step 127 that the power-off signal for the flowmeter (converter) has not been detected, the processing returns to Step 130, in which the flow of the time measuring processing of the real-time clock IC (RTC) 11 in the real-time timestamp mode, which is illustrated in FIG. 9, continues to be executed.

On the other hand, when it is determined in Step 127 that the power-off signal for the flowmeter (converter) has been detected, in Step 128, the elapsed real time represented by the measured time value of the real-time clock IC (RTC) 11 obtained when the flowmeter (converter) is shut off is stored as save data ("F data") in the EEPROM 12 being the non-volatile memory.

Figure 10:
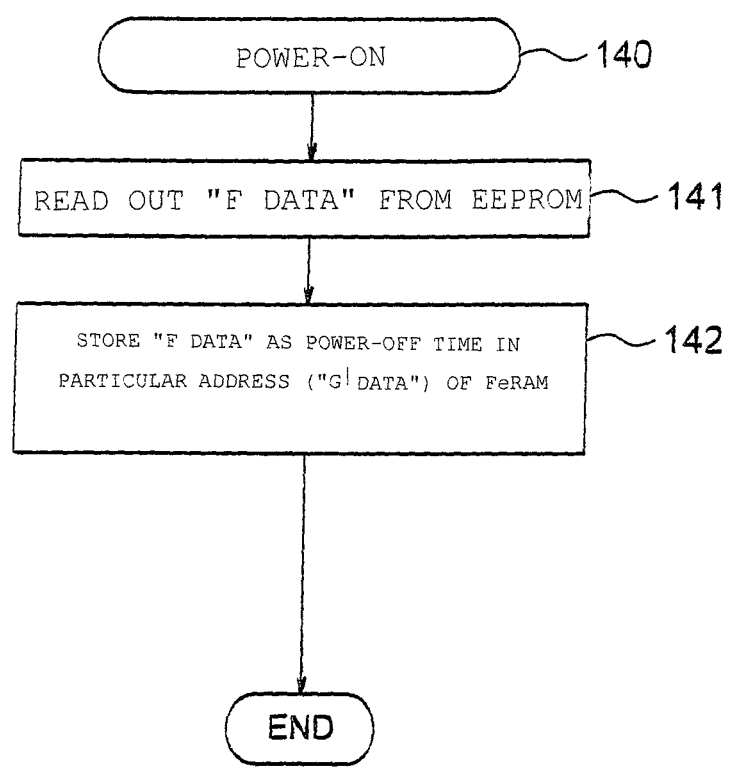
FIG. 10 is a flow chart for detecting power shut-off in the real-time timestamp mode.

FIG. 10 illustrates a flow chart for detecting power shut-off in the real-time timestamp mode.

First, in Step 140, the flowmeter (converter) is powered on, and a flow for detecting power shut-off is started in the real-time timestamp mode.

After the start of the flow in Step 140, first, in Step 141, the save data ("F data") of the elapsed real time represented by the measured time value of the real-time clock IC (RTC) 11 obtained when the flowmeter (converter) is shut off, which is stored in the EEPROM 12, is read out.

After the save data ("F data") of the elapsed time, which is stored in the EEPROM 12, is read out in Step 141, in Step 142, the save data ("F data") of the elapsed real time represented by the measured time value of the real-time clock IC (RTC) 11 obtained when the flowmeter (converter) is shut off, which is stored in the EEPROM 12 with the measured time value of the real-time clock IC (RTC) 11 obtained when the flowmeter (converter) is shut off as the shutoff of the flowmeter (converter), is stored in the particular address ("G data") of the FeRAM (ferroelectric memory) 13 in Step 142, and the flow for detecting the shutoff in the real-time timestamp mode is terminated.

Figure 11:
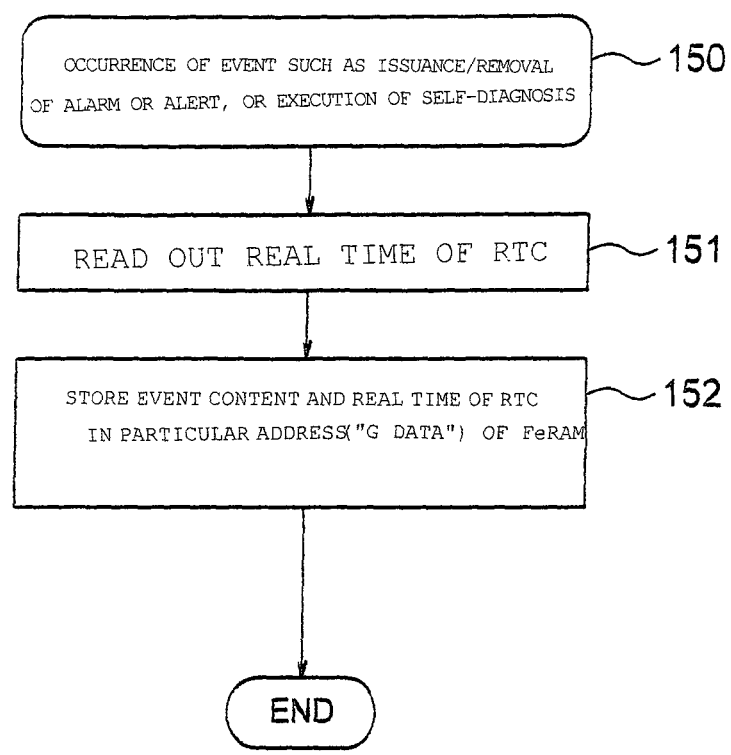
FIG. 11 is an error-logging flow chart in the real-time timestamp mode.

FIG. 11 illustrates an error-logging flow chart in the real-time timestamp mode. Specifically, the error-logging flow of FIG. 11 is a processing flow chart used when the operation state (the issuance/stopping of an alarm or an alert, results of self-diagnosis, etc.) of the apparatus is logged (recorded) in the real-time timestamp mode.

First, when such an event as the issuance/removal of an alarm or an alert, or the execution of the self-diagnosis has occurred in the flowmeter (converter) in Step 150, in Step 151, the real time measured by the real-time clock IC (RTC) 11 at the time of the occurrence of the event in the flowmeter (converter) is read out.

After the real time measured by the real-time clock IC (RTC) is read out in Step 151, in Step 152, the content (the issuance/removal of an alarm or an alert, the execution of the self-diagnosis, etc.) of the event which has occurred in the flowmeter (converter), and the real time measured by the real-time clock IC (RTC) 11 are stored in the particular address ("G data") of the FeRAM (ferroelectric memory) 13. Then, the error logging flow in the real-time timestamp mode, which is illustrated in FIG. 11, is terminated.

The power-off time of the flowmeter (converter) is also stored in the particular address ("G data") of the FeRAM (ferroelectric memory) 13. As the power-off time, the save data ("F data") of the real time represented by the measured time value of the real-time clock IC (RTC) 11 obtained when the flowmeter (converter) is shut off immediately after the power-on is stored (see Step 142 of FIG. 10). In this embodiment, up to 20 data items can be stored in the particular address ("G data") of the FeRAM (ferroelectric memory) 13, and new data items which come 21st and thereafter are overwritten onto the first data item, which has been stored first.

Second Embodiment

Figure 12:
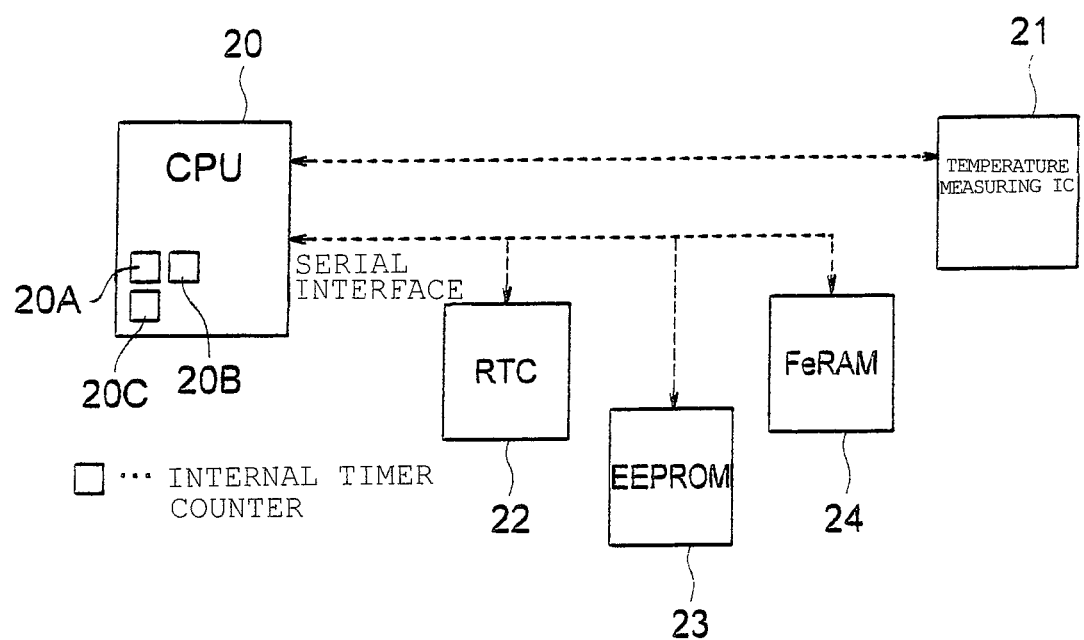
FIG. 12 is a circuit configuration diagram of a CPU of the maintenance expert system for a measuring instrument, which is illustrated in FIG. 1, according to a second embodiment.

FIG. 12 is a circuit configuration diagram of a CPU circuit 2 of the maintenance expert system in the Coriolis flowmeter, which is illustrated in FIG. 1, according to a second embodiment.

Referring to FIG. 12, the CPU circuit 2 is provided with a CPU 20, and the CPU 20 is provided with internal timer counters 20A, 20B, and 20C. Further, a temperature measuring IC 21 is connected to the CPU 20 via a bus line. Further, a real-time clock IC (RTC) 22, an EEPROM 23 being a rewritable non-volatile memory, and an FeRAM (ferroelectric memory) 24 being a non-volatile semiconductor memory which utilizes ferroelectric hysteresis to associate positive and negative spontaneous polarizations with "1" and "0" are connected to the CPU 20 via bus lines.

The CPU 20 illustrated in FIG. 12 has a similar function as that of the CPU 9 illustrated in FIG. 2, and the internal timer counters 20A, 20B, and 20C of the CPU 20 respectively correspond to the internal timer counters 9A, 9B, and 9C of the CPU 9 illustrated in FIG. 2.

Further, the real-time clock IC (RTC) 22, the EEPROM 23, and the FeRAM (ferroelectric memory) 24 are connected to the CPU 20 by using a serial interface.

The primary function of the maintenance expert system configured as described above is data logging, and a time measuring system plays an important role. In this embodiment, a built-in battery (backup battery) is not provided, and hence though the real-time clock IC (RTC) 22 is provided, it is impossible to perform truly real-time time measurement. To address this, in this embodiment, the time measurement is executed using two modes of the elapsed-time timestamp mode and the real-time timestamp mode.

In the elapsed-time timestamp mode, the time measurement is started at the power-on from 0:00:00 (0 hours, 00 minutes, 00 seconds), and is continued while the flowmeter (converter) is operating. This function is disabled in the real-time timestamp mode to be described next.

In the real-time timestamp mode, after the converter is powered on, the operator sets actual date and real time (hours, minutes, seconds) in advance, and then starts the time measurement (flowmeter). The time measurement thus started is continued until the power is turned off or until the mode is shifted to the elapsed-time timestamp mode.

Switchover between the two modes is performed by the operator using the communication tool 7 or the like.

In this embodiment, as in the first embodiment, the EEPROM 23 and the FeRAM (ferroelectric memory) 24 are provided, and different pieces of data are stored therein.

The EEPROM 23 stores the elapsed-time save data (referred to as "A data") and the elapsed-real-time save data (referred to as "F data").

The FeRAM (ferroelectric memory) 24 stores: the elapsed operation time (cumulative time) data (referred to as "B data") being a total operation time period of the flowmeter (converter); the power-abnormality-occurrence count data (referred to as "D data") indicating the number of times a power abnormality has occurred; the data (referred to as "G data") obtained by logging the issuance/removal of an alert being a warning message and of an alarm calling attention, results of self-diagnosis, and power-off time; the internal-temperature log data (referred to as "H data") obtained by recording the temperature measured in the hermetically sealed flowmeter (converter); and the initial real-time set value (referred to as "Z data").

The maintenance expert system configured as described above has the function of logging the state of the flowmeter, the function of monitoring/logging the internal temperature, the function of measuring the operation time period of the flowmeter, the function of detecting and recording a power abnormality caused by an instantaneous power failure occurring immediately after the power-on, and the function of displaying an indication that the flowmeter is in a warm-up period.

Next, of those functions, five functions of (1) the flowmeter-state logging function, (2) the operation-time-period measuring function, (3) the abnormal-power-on detecting function, (4) the warm-up-period indicating function, and (5) the operation-time-period measuring function are as described in the first embodiment. Here, (6) an internal-temperature monitoring/logging function is described.

(6) Internal-Temperature Monitoring/Logging Function

This is a function of monitoring the temperature inside the hermetically sealed flowmeter (converter) and logging the temperature, and includes the following functions.

After the flowmeter (converter) is activated, the detection data of the temperature measuring IC 21 is regularly recorded (logged), along with the timestamp, as the internal-temperature log data indicating the internal temperature ("H data") in the FeRAM (ferroelectric memory) 24 being the non-volatile memory. Along with the recording (logging), an upper-limit value and a lower-limit value are provided with respect to a sample temperature, and a determination is made for the recorded (logged) internal temperature. Then, a result of the determination is recorded (logged), and at the same time, when the result of the determination is NG, an indication to that effect is displayed on the display unit 5.

Further, as an option, it is possible to associate the internal-temperature log data indicating the internal temperature with the real-time timestamp.

Then, when the detection data of the temperature measuring IC 21 is equal to or larger than a given threshold in the internal-temperature monitoring/logging function, the warm-up-period indicating function is stopped.

Figure 13:
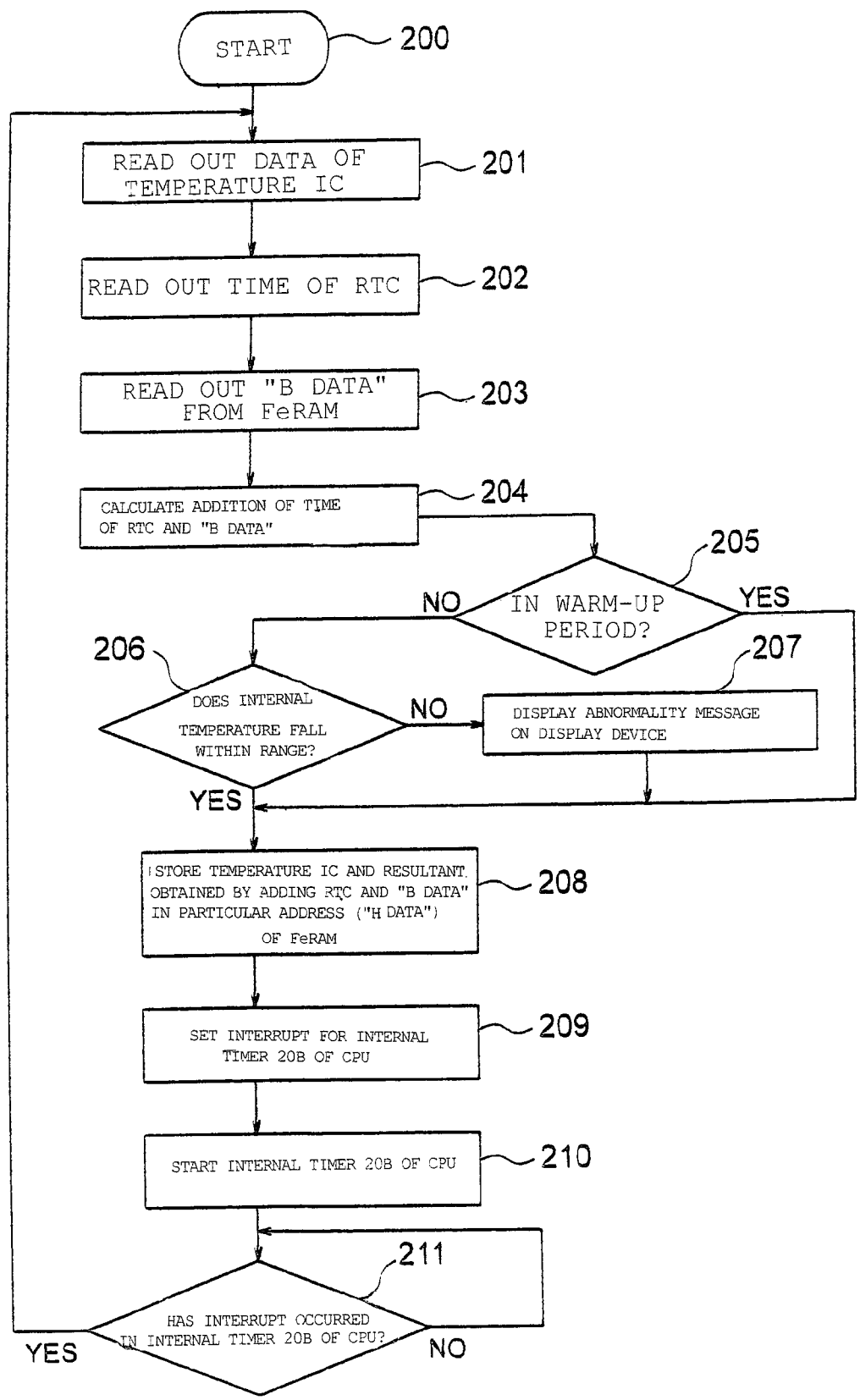
FIG. 13 is a basic flow chart of an internal-temperature monitoring function in the elapsed-time timestamp mode.

FIG. 13 illustrates a basic flow chart of the function of monitoring the internal temperature in the elapsed-time timestamp mode. Specifically, the basic flow chart of the internal-temperature monitoring function, which is illustrated in FIG. 13, is a processing flow chart used in a case where an abnormality message (warning) is issued when an abnormality has occurred in the temperature inside the hermetically sealed flowmeter (converter) (internal temperature) while the temperature inside the hermetically sealed flowmeter (converter) (internal temperature) is monitored in the elapsed-time timestamp mode, and the internal-temperature data is logged (recorded).

In this embodiment, the processing of the basic flow of the internal-temperature monitoring function in the elapsed-time timestamp mode, which is illustrated in FIG. 13, is performed regularly (for example, every 10 minutes).

After the basic flow of the internal-temperature monitoring function in the elapsed-time timestamp mode, which is illustrated in FIG. 13, is started in Step 200, in Step 201, the detection (measured temperature) data of the temperature measuring IC 21 measuring the temperature inside the hermetically sealed flowmeter (converter) (internal temperature) is read out. After the detection (measured temperature) data of the temperature measuring IC 21 is read out in Step 201, in Step 202, the measured time value of the real-time clock IC (RTC) 22 is read out.

After the measured time value of the real-time clock IC (RTC) 22 is read out in Step 202, in Step 203, the elapsed time ("B data") stored in a particular address of the FeRAM (ferroelectric memory) 24 is read out. After the elapsed time ("B data") is read out in Step 203, in Step 204, the elapsed time ("B data") read out from the particular address of the FeRAM (ferroelectric memory) 24 is added to the measured time value of the real-time clock IC (RTC) 22, thereby calculating the elapsed operation time (cumulative time), which is the total operation time period of the flowmeter (converter).

In Step 204, the measurement time of the real-time clock IC (RTC) is obtained through a calculation performed by discarding the year, the date, and the hour of the time "0:00:00 (0 hours, 00 minutes, 00 seconds), January 1, 00 (year)" set in the real-time clock IC (RTC) 22. In other words, only "00:00 (00 minutes, 00 seconds)" is used as the measurement time of the real-time clock IC (RTC) 22.

After the elapsed operation time (cumulative time), which is the total operation time period of the flowmeter (converter), is calculated in Step 204, it is determined in Step 205 whether or not the flowmeter (converter) has just been powered on and is in the warm-up period. When it is determined in Step 205 that the flowmeter (converter) has just been powered on and is in the warm-up period, the processing proceeds to Step 208.

On the other hand, when it is determined in Step 205 that the flowmeter (converter) is not in the warm-up period, it is determined in Step 206 whether or not the temperature inside the hermetically sealed flowmeter (converter) (internal temperature) falls within a preset range.

When it is determined in Step 206 that the temperature inside the hermetically sealed flowmeter (converter) (internal temperature) does not fall within the preset range, in Step 207, the abnormality message indicating that an abnormality has occurred in the temperature inside the flowmeter (converter) (internal temperature) is displayed on the display unit 5.

On the other hand, when it is determined in Step 206 that the temperature inside the hermetically sealed flowmeter (converter) (internal temperature) falls within the preset range, in Step 208, the detection data of the temperature measuring IC 21 and a resultant obtained by adding the measured time value of the real-time clock IC (RTC) 22 to the elapsed time ("B data") read out from the particular address of the FeRAM (ferroelectric memory) 24 are stored in a particular address ("H data") of the FeRAM (ferroelectric memory) 24.

After the storage into the particular address ("H data") of the FeRAM (ferroelectric memory) 24 in Step 208, in Step 209, an interrupt is set for the internal timer counter 20B built in the CPU 20. When an interrupt has occurred in the internal timer counter 20B in Step 209, the internal timer counter 20B is started in Step 210.

After the internal timer counter 20B is started in Step 210, it is determined in Step 211 whether or not an interrupt has occurred in the internal timer counter 20B (in this embodiment, an interrupt signal is issued every 10 minutes). When it is determined in Step 211 that an interrupt has not occurred in the internal timer counter 20B, the processing does not proceed until an interrupt occurs in the internal timer counter 20B. On the other hand, when it is determined in Step 211 that an interrupt (every 10 minutes) has occurred in the internal timer counter 20B, the processing returns to Step 201, and the readout of the detection data of the temperature measuring IC 21 and Steps 202 to 211 are repeatedly executed.

Figure 14:
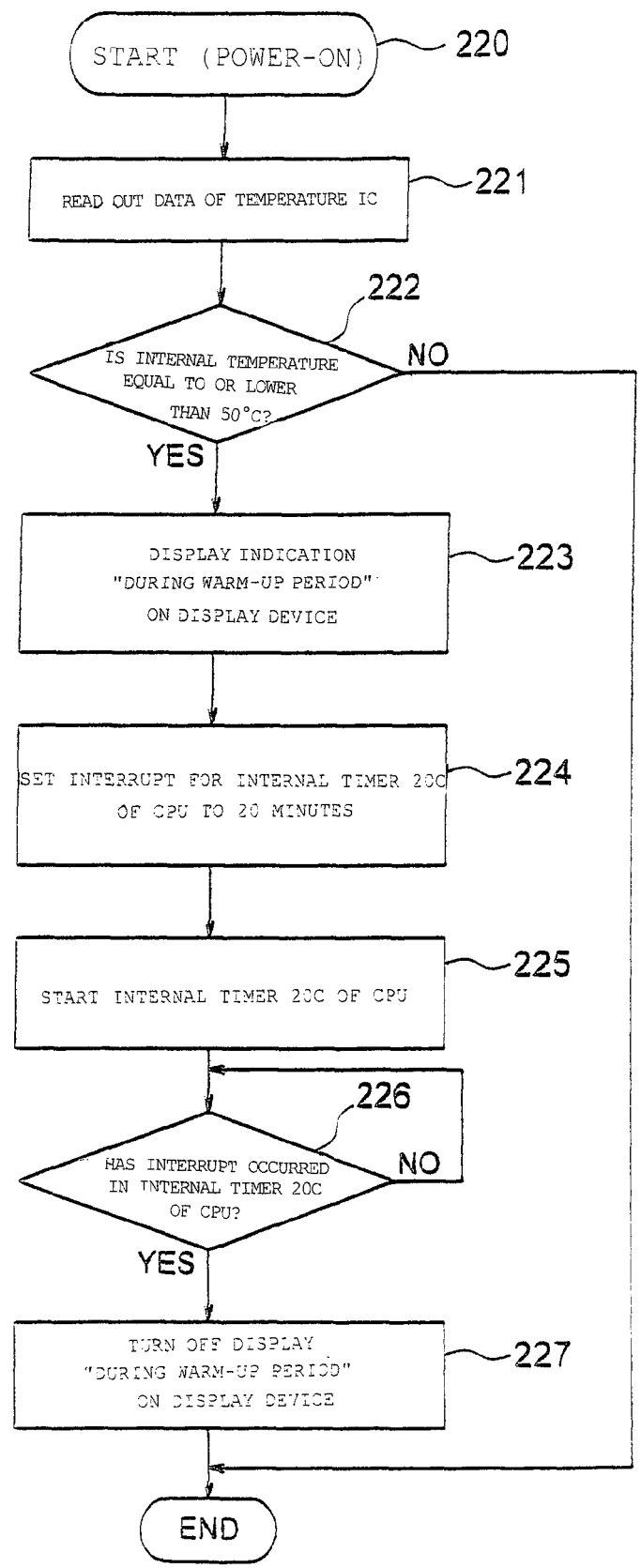
FIG. 14 is a basic flow chart of a function of displaying an indication that the measuring instrument is in the warm-up period.

Next, description is given of the warm-up-period indicating function of this embodiment with reference to a basic flow chart of the function of displaying an indication that the flowmeter (converter) is in the warm-up period, which is illustrated in FIG. 14.

The basic flow chart of the warm-up-period indicating function, which is illustrated in FIG. 14, is a processing flow chart used when an indication that the flowmeter is in the warm-up period is displayed so as to prompt the user to give sufficient consideration to using detection data obtained immediately after the flowmeter (converter) is started up. This is because the flowmeter (converter) itself is not stable immediately after the flowmeter (converter) is started up (activated), and thus there may occur an error in the detection data.

The basic flow of the warm-up-period indicating function, which is illustrated in FIG. 14, starts when the power is turned on in Step 220. After the power is turned on in Step 220, in Step 221, the detection (measured temperature) data of the temperature measuring IC 21 measuring the temperature inside the hermetically sealed flowmeter (converter) (internal temperature) is read out.

After the detection (measured temperature) data of the temperature measuring IC 21 is readout in Step 221, it is determined in Step 222 whether or not the measured temperature detected by the temperature measuring IC 21 is equal to or lower than a preset temperature (for example, 50° C.)

When it is determined in Step 222 that the measured temperature detected by the temperature measuring IC 21 is not equal to or lower than the preset temperature (for example, 50° C.), the basic flow of the warm-up-period indicating function, which is illustrated in FIG. 14, is terminated.

On the other hand, when it is determined in Step 222 that the measured temperature detected by the temperature measuring IC 21 is equal to or lower than the preset temperature (for example, 50° C.), in Step 223, the message indicating that the flowmeter (converter) is in the warm-up period is displayed on the display unit 5.

After the message indicating that the flowmeter (converter) is in the warm-up period is displayed on the display unit 5 in Step 223, in Step 224, a setting is made so that an interrupt occurs in the internal timer counter 20C at fixed time intervals (in this embodiment, an interrupt signal is issued every 20 minutes).

Then, after the setting is made in Step 224 so that an interrupt occurs in the internal timer counter 20C at the fixed time intervals (in this embodiment, every 20 minutes), the internal timer counter 20C is started in Step 225.

After the internal timer counter 20C is started in Step 225, it is determined in Step 226 whether or not an interrupt has occurred in the internal timer counter 20C. When it is determined in Step 226 that an interrupt has not occurred in the internal timer counter 20C, the processing does not proceed until an interrupt occurs in the internal timer counter 20C.

On the other hand, when it is determined in Step 226 that an interrupt has occurred in the internal timer counter 20C, in Step 227, the message indicating that the flowmeter (converter) is in the warm-up period, which is displayed on the display unit 5, is turned off, and the basic flow of the warm-up-period indicating function, which is illustrated in FIG. 14, is terminated.

Figure 15:
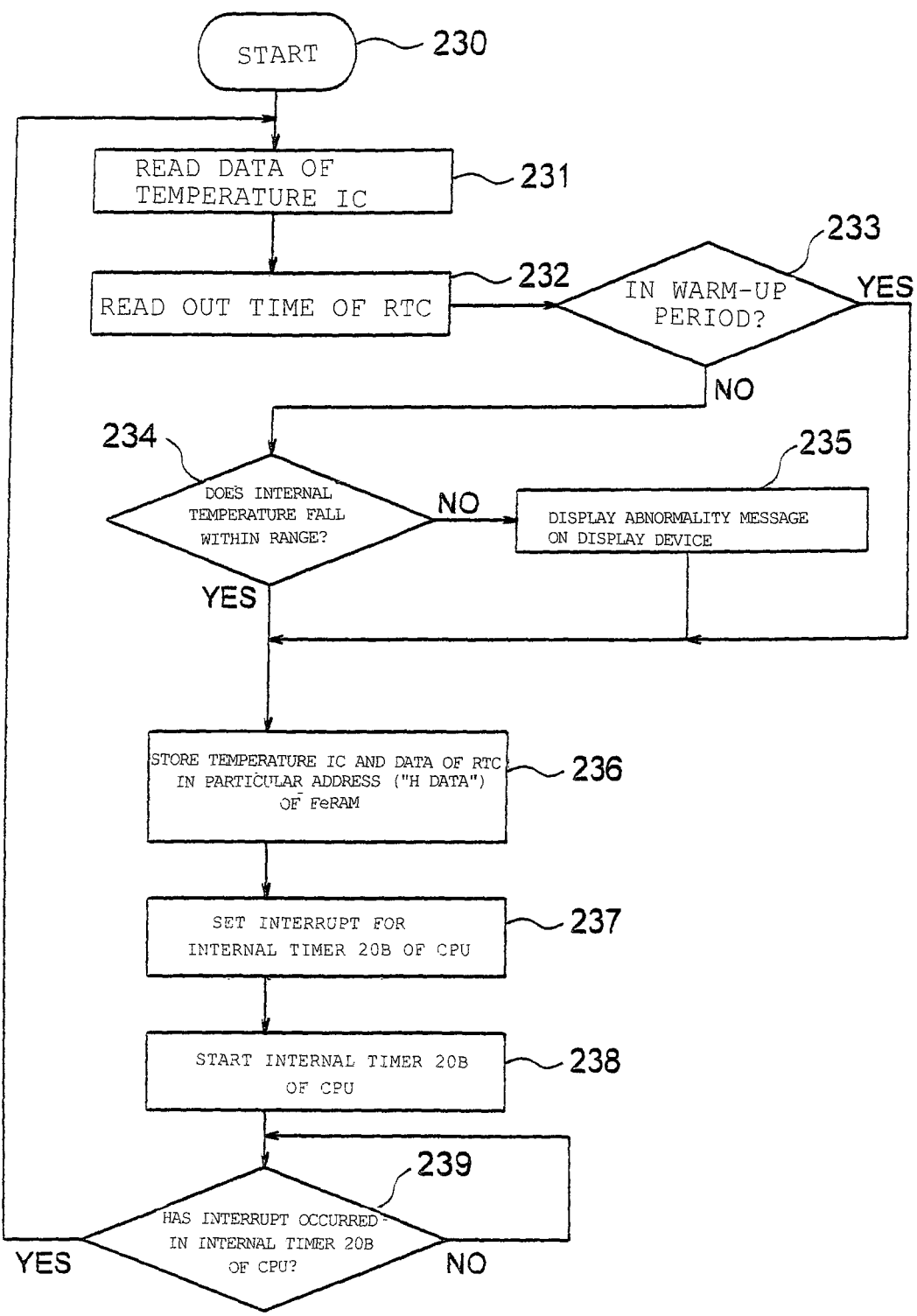
FIG. 15 is a basic flow chart of an internal-temperature monitoring function in the real-time timestamp mode.

Next, description is given of the internal-temperature monitoring function in the real-time timestamp mode according to this embodiment with reference to a basic flow chart of the internal-temperature monitoring function in the real-time timestamp mode, which is illustrated in FIG. 15.

The basic flow chart of the internal-temperature monitoring function, which is illustrated in FIG. 15, is a processing flow chart used in a case where an abnormality message (warning) is issued when an abnormality has occurred in the temperature inside the hermetically sealed flowmeter (converter) (internal temperature) while the temperature inside the hermetically sealed flowmeter (converter) (internal temperature) is monitored in the real-time timestamp mode, and the internal-temperature data is logged (recorded).

In this embodiment, the processing of the basic flow of the internal-temperature monitoring function in the real-time timestamp mode, which is illustrated in FIG. 15, is performed regularly (for example, every 10 minutes).

After the basic flow of the internal-temperature monitoring function in the real-time timestamp mode, which is illustrated in FIG. 15, is started in Step 230, in Step 231, the detection (measured temperature) data of the temperature measuring IC 21 measuring the temperature inside the hermetically sealed flowmeter (converter) (internal temperature) is read out. After the detection (measured temperature) data of the temperature measuring IC 21 is read out in Step 231, in Step 232, the measured real time of the real-time clock IC (RTC) is read out.

After the measured real time of the real-time clock IC (RTC) is read out in Step 232, it is determined in Step 233 whether or not the flowmeter (converter) has just been powered on and is in the warm-up period. When it is determined in Step 233 that the flowmeter (converter) has just been powered on and is in the warm-up period, the processing proceeds to Step 236.

On the other hand, when it is determined in Step 233 that the flowmeter (converter) is not in the warm-up period, it is determined in Step 234 whether or not the temperature inside the hermetically sealed flowmeter (converter) (internal temperature) falls within a preset range.

When it is determined in Step 234 that the temperature inside the hermetically sealed flowmeter (converter) (internal temperature) does not fall within the preset range, in Step 235, the abnormality message indicating that an abnormality has occurred in the temperature inside the flowmeter (converter) (internal temperature) is displayed on the display unit 5.

On the other hand, when it is determined in Step 234 that the temperature inside the hermetically sealed flowmeter (converter) (internal temperature) falls within the preset range, in Step 236, the detection (measured temperature) data of the temperature measuring IC 21 and the measured real time of the real-time clock IC (RTC) are stored in a particular address ("H data") of the FeRAM (ferroelectric memory) 24.

After the storage into the particular address ("H data") of the FeRAM (ferroelectric memory) 24 in Step 236, in Step 237, an interrupt is set for the internal timer counter 20B built in the CPU 20. When an interrupt has occurred in the internal timer counter 20B in Step 237, the internal timer counter 20B is started in Step 238.

After the internal timer counter 20B is started in Step 238, it is determined in Step 239 whether or not an interrupt has occurred in the internal timer counter 20B (in this embodiment, an interrupt signal is issued every 10 minutes). When it is determined in Step 239 that an interrupt has not occurred in the internal timer counter 20B, the processing does not proceed until an interrupt occurs in the internal timer counter 20B. On the other hand, when it is determined in Step 239 that an interrupt (every 10 minutes) has occurred in the internal timer counter 20B, the processing returns to Step 231, and the readout of the detection data of the temperature measuring IC 21 and Steps 232 to 239 are repeatedly executed.

As described above, the present system has the following features.

(1) The present system has the real-time timestamp mode and the elapsed-time timestamp mode.

In the real-time timestamp mode, the operator sets the real time in advance for the flowmeter after the power is turned on, and thus the timestamp to be assigned for the data logging or the like is issued based on the real time.

In the elapsed-time timestamp mode, zero-start is performed upon the power-on, and thus the timestamp is issued based on the elapsed time.

(2) The present system logs the operation state (the issuance/stopping of an alarm or an alert, results of self-diagnosis, etc.) of the apparatus.

(3) The present system monitors the time period from the power-on until the power-off of the apparatus, and records the number of power abnormalities (short-time-period power-ons).

(4) The present system cumulates the record of the time period from the power-on until the power-off of the apparatus, sets the threshold, and when the set threshold has been reached, issues a message recommending an inspection.

(5) During the warm-up period immediately after the power-on, an indication to that effect is displayed by the display device.

(6) The present system monitors and measures the temperature inside the apparatus by the temperature sensor, and logs the data. Further, a warning is issued to the display device at the time of a temperature abnormality.

Therefore, according to the present system, the data can be utilized as reference data (reference data for troubleshooting) for maintenance service after the delivery to a customer.

Further, according to the present system, in contrast to the fact that the operation time period of the apparatus conventionally starts immediately after the delivery, a more specific operation time period is grasped for each of a plurality of delivered apparatuses, with the result that a timing for maintenance can be made more specific.

Further, the present system can be utilized for a function of monitoring the range of operating temperature of the flowmeter.

Further, according to the present system, it is possible to issue a warning to the effect that a power abnormality occurred at the time of the previous power-on.

Still further, according to the present system, there is no need to replace batteries because a backup battery is not used.

Still further, according to the present system, it is possible to provide a notification that the flowmeter (converter) is in the warm-up period, which enables appropriate usage.

The invention claimed is:

1. A maintenance expert system including a measuring instrument, the measuring instrument comprising:
a CPU comprising a plurality of internal timer counters and having a function of receiving inputs of signals from various sensors which detect a state of the measuring instrument and calculating a measured value of an object to be measured based on detection values of the various sensors;
a power supply circuit for activating (ON) or stopping (OFF) the measuring instrument;
a display unit for displaying detection input data, which is input from the various sensors to the CPU, and the measured value of the object to be measured, which is calculated by the CPU;
a real-time clock IC (RTC) connected to the CPU via a bus line, for measuring time;
an EEPROM connected to the CPU via a bus line, for storing data input to the CPU; and
an FeRAM connected to the CPU via a bus line, for storing input values from the various sensors via the CPU, storing the measured value calculated by the CPU based on the detection values from the sensors as a calculation result, and storing a corresponding timing at which the calculation result is saved.

2. The maintenance expert system of claim 1, wherein the EEPROM and the FeRAM are selectively used according to data input to the CPU, data and a timing at which the calculation result is saved, or a frequency with which the calculation result is saved.

3. The maintenance expert system of claim 2, wherein the display unit has a function of displaying, based on a cumulative operation time period of the measuring instrument, a recommended replacement timing of components used in the measuring instrument or arrival of a maintenance/inspection timing of the measuring instrument.

4. The maintenance expert system of claim 3, wherein the measuring instrument has a function of logging the state of the measuring instrument, a function of measuring an operation time period of the measuring instrument, a function of detecting and recording a power abnormality caused by an instantaneous power failure occurring immediately after power-on, and a function of displaying an indication that the measuring instrument is in a warm-up period.

5. The maintenance expert system of claim 2, wherein the measuring instrument has a function of logging the state of the measuring instrument, a function of measuring an operation time period of the measuring instrument, a function of detecting and recording a power abnormality caused by an instantaneous power failure occurring immediately after power-on, and a function of displaying an indication that the measuring instrument is in a warm-up period.

6. The maintenance expert system of claim 2, wherein the measuring instrument further comprises a temperature measuring IC for measuring an internal temperature of the measuring instrument, the temperature measuring IC being connected to the CPU and accommodated in a hermetically sealed casing of the measuring instrument.

7. The maintenance expert system of claim 1, wherein the display unit has a function of displaying, based on a cumulative operation time period of the measuring instrument, a recommended replacement timing of components used in the measuring instrument or arrival of a maintenance/inspection timing of the measuring instrument.

8. The maintenance expert system of claim 7, wherein the measuring instrument has a function of logging the state of the measuring instrument, a function of measuring an operation time period of the measuring instrument, a function of detecting and recording a power abnormality caused by an instantaneous power failure occurring immediately after power-on, and a function of displaying an indication that the measuring instrument is in a warm-up period.

9. The maintenance expert system of claim 1, wherein the measuring instrument has a function of logging the state of the measuring instrument, a function of measuring an operation time period of the measuring instrument, a function of detecting and recording a power abnormality caused by an instantaneous power failure occurring immediately after power-on, and a function of displaying an indication that the measuring instrument is in a warm-up period.

10. The maintenance expert system of claim 9, wherein the function of logging the state of the measuring instrument comprises:
a first function of, every time an event indicating the state of the measuring instrument occurs, in order to assign a timestamp of an elapsed time, logging elapsed operation time (cumulative time) data, which is a total operation time period of the measuring instrument, as "B data", and also logging a measured time value of the real-time clock IC (RTC) as event log data ("G data") in the FeRAM;
a second function of, in order to assign a timestamp of a time (elapsed) when power is shut off, which is one of occurring events indicating the state of the measuring instrument, recording elapsed-time save data of the measured time value of the real-time clock IC (RTC) as "A data" in the EEPROM when the power is shut off;
a third function of, as an option of the function of assigning and recording (logging) the timestamp, recording real date and real time in association therewith as "G data" in the FeRAM; and
a fourth function of, when the power is shut off during operation in the optional function, recording, as a real-time timestamp, the measured time value of the real-time clock IC (RTC) as "F data" in the EEPROM.

11. The maintenance expert system of claim 10,
wherein the operation-time-period measuring function comprises the function of measuring the operation time period of the measuring instrument, and
wherein, in the operation-time-period measuring function, in order to cumulate the operation time period (elapsed time) immediately after the measuring instrument is activated, operation-time-period measuring data, which is obtained by performing time measurement every one hour by the internal timer counter built in the CPU, is recorded (logged) as the "B data" in the FeRAM.

12. The maintenance expert system of claim 11,
wherein the abnormal-power-on detecting function comprises the function of detecting and recording (logging) the power abnormality caused by the instantaneous power failure (OFF) occurring immediately after the measuring instrument is powered on, and
wherein, in the abnormal-power-on detecting function: a cumulative time from immediately after the activation (immediately after the power-on) of the measuring instrument until the instantaneous power failure (OFF) is obtained through a subtraction, and when the cumulative time is short (for example, three seconds or shorter), the power abnormality is considered to have occurred; abnormal-power-on detection data, which indicates a number of times the power abnormality has occurred, is recorded (logged) as "D data" in the FeRAM; and the abnormal-power-on detection information is displayed on the display unit of the measuring instrument.

13. The maintenance expert system of claim 9,
wherein the warm-up-period indicating function comprises the function of displaying the indication that the measuring instrument has just been powered on and is in the warm-up period, and
wherein, in the warm-up-period indicating function, the elapsed time since the power-on of the measuring instrument is measured by the internal timer counter built in the CPU, and the indication that the measuring instrument is in the warm-up period is displayed on the display unit of the measuring instrument for a given period of time.

14. The maintenance expert system of claim 1, wherein the measuring instrument further comprises a temperature measuring IC for measuring an internal temperature of the measuring instrument, the temperature measuring IC being connected to the CPU and accommodated in a hermetically sealed casing of the measuring instrument.

15. The maintenance expert system of claim 14, wherein the measuring instrument has a function of monitoring and logging the internal temperature.

16. The maintenance expert system of claim 15,
wherein the internal-temperature monitoring/logging function comprises the function of monitoring the temperature inside the measuring instrument hermetically sealed by the casing and logging the temperature, and
wherein, in the internal-temperature monitoring/logging function: after the measuring instrument is activated, detection data of the temperature measuring IC is regularly recorded (logged), along with the timestamp, as internal-temperature log data indicating the internal temperature ("H data") in the FeRAM; an upper-limit value and a lower-limit value are provided with respect to a sample temperature, and a determination is made for the recorded (logged) internal temperature; and when a result of the determination is NG, an indication to that effect is displayed on the display unit.

17. The maintenance expert system of claim 1, wherein the EEPROM stores the elapsed-time save data ("A data") and elapsed-real-time save data ("F data").

18. The maintenance expert system of claim 1, wherein the FeRAM stores: the elapsed operation time (cumulative time) data ("B data") being the total operation time period of the measuring instrument; power-abnormality-occurrence count data ("D data") indicating the number of times the power abnormality has occurred; data ("G data") obtained by logging issuance/removal of an alert being a warning message and of an alarm calling attention, results of self-diagnosis, and power-off time; the internal-temperature log data ("H data") obtained by recording the temperature measured in the hermetically sealed measuring instrument; and an initial real-time set value ("Z data").

19. The maintenance expert system of claim 1, wherein the real-time clock IC (RTC) switches between two modes of an elapsed-time timestamp mode and a real-time timestamp mode to perform time measurement for each of the two modes.

20. A maintenance expert system including a Coriolis flowmeter the Coriolis flowmeter comprising:
a CPU comprising a plurality of internal timer counters, and having a function of: receiving inputs of signals from various sensors which detect a state of the Coriolis flowmeter; controlling the driving means, to thereby alternately drive the flow tube at an alternate-driving frequency, which is the same as an eigen frequency of the flow tube; detecting, by an electromagnetic pickoff, a phase difference and/or an oscillation frequency proportional to a Coriolis force generated in the flow tube; and calculating a flow rate of the fluid to be measured;
a power supply circuit for activating (ON) or stopping (OFF) the Coriolis flowmeter;
a detector for detecting the Coriolis force generated in the flow tube, by alternately driving the flow tube by the driving means implemented by a combination of a coil and a magnet in the flow tube;

a display unit for displaying detection input data input from the various sensors to the CPU and the flow rate of the fluid to be measured, which is obtained through a calculation by the CPU based on the Coriolis force generated in the flow tube;

a real-time clock IC (RTC) connected to the CPU via a bus line, for measuring time;

an EEPROM connected to the CPU via a bus line, for storing data input to the CPU; and an FeRAM connected to the CPU via a bus line, for storing input values from the various sensors via the CPU, storing the measured value calculated by the CPU based on the detection values from the sensors as a calculation result, and storing a corresponding timing at which the calculation result is saved.

* * * * *